US010020860B2

United States Patent
Onggosanusi et al.

(10) Patent No.: US 10,020,860 B2
(45) Date of Patent: Jul. 10, 2018

(54) DOWNLINK SIGNALING FOR PARTIALLY PRECODED CSI-RS AND CSI FEEDBACK

(71) Applicant: Samsung Electronics Co., Ltd., Suwon-si, Gyeonggi-do (KR)

(72) Inventors: Eko Onggosanusi, Allen, TX (US); Boon Loong Ng, Plano, TX (US); Young-Han Nam, Plano, TX (US); Hee Don Gha, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 14/954,838

(22) Filed: Nov. 30, 2015

(65) Prior Publication Data

US 2016/0156401 A1    Jun. 2, 2016

Related U.S. Application Data

(60) Provisional application No. 62/086,488, filed on Dec. 2, 2014, provisional application No. 62/113,752, filed on Feb. 9, 2015, provisional application No. 62/173,611, filed on Jun. 10, 2015, provisional application No. 62/204,107, filed on Aug. 12, 2015, provisional application No. 62/208,252, filed on Aug. 21, 2015, provisional application No. 62/213,938, filed on Sep. 3, 2015.

(51) Int. Cl.
*H04B 7/00* (2006.01)
*H04B 7/06* (2006.01)
*H04B 7/0456* (2017.01)

(52) U.S. Cl.
CPC ......... *H04B 7/0645* (2013.01); *H04B 7/0478* (2013.01)

(58) Field of Classification Search
CPC combination set(s) only.
See application file for complete search history.

(56) References Cited

U.S. PATENT DOCUMENTS 9,106,395 B2 *   8/2015   Lee, II .................. H04L 5/0051
9,398,481 B2 *   7/2016   Chai ..................... H04W 24/00
(Continued)

OTHER PUBLICATIONS

ETRI, Potential CSI-RS and CSI feedback enhancement for EBF/FD-MIMO, 3GPP TSG RAN WG1 Meeting #79, 6 pages, Nov. 2014.*

(Continued)

*Primary Examiner* — Frank Duong

(57) ABSTRACT

User equipment (UE) is configured to receive two types of channel state information (CSI) reference signals (CSI-RS), the first containing more antenna ports and measured less often than the second. A first CSI report is based on first type CSI-RS and a second CSI report on the second type CSI-RS. The second type CSI-RS is at least partially precoded in response to the first CSI report, is precoded for the specific UE, and is transmitted more often than the first type CSI-RS, while the first type CSI-RS is not precoded. The first CSI report contains a first precoding matrix indicator (PMI) parameter and the second CSI report contains only a second PMI parameter of a two-PMI codebook, where the first PMI parameter is a long-term and wideband PMI. The first PMI is derived from measuring the first type CSI-RS in a plurality of subframes and resource blocks.

20 Claims, 8 Drawing Sheets

(56) References Cited

U.S. PATENT DOCUMENTS

| | | | |
|---|---|---|---|
| 2013/0051321 A1 | 2/2013 | Barbieri et al. | |
| 2013/0148515 A1 | 6/2013 | Ribeiro et al. | |
| 2013/0242773 A1 | 9/2013 | Wernersson et al. | |
| 2013/0258964 A1* | 10/2013 | Nam | H04W 72/046 370/329 |
| 2013/0267268 A1 | 10/2013 | Lee et al. | |
| 2014/0079146 A1* | 3/2014 | Kim | H04B 7/0417 375/260 |
| 2014/0169415 A1* | 6/2014 | Werner | H04B 7/0456 375/219 |
| 2014/0177744 A1 | 6/2014 | Krishnamurthy et al. | |

OTHER PUBLICATIONS

International Search Report and Written Opinion issued for PCT/KR2015/013094 dated Mar. 10, 2016, 9 pgs.

NVIDIA, "Performance of UE Specific Elevation Beamforming Using Two NZP CSI-RS Resources", R1-145015, 3GPP TSG-RAN WG1 #79, Nov. 8, 2014, 4 pgs.

Samsung, "CSI Feedback Mechanism for Multiple Transmission Points", R1-114224, 3GPP TSG RAN WG1 #67, Nov. 9, 2011, 5 pgs.

Communication from a foreign patent office in a counterpart foreign application, European Patent Office, "Supplementary European Search Report," Application No. EP 15865469.9, dated Oct. 30, 2017, 8 pages.

\* cited by examiner

DOWNLINK SIGNALING FOR PARTIALLY PRECODED CSI-RS AND CSI FEEDBACK

This application claims priority to U.S. Provisional Patent Application No. 62/213,938 filed Sep. 3, 2015 and entitled "DOWNLINK SIGNALING FOR PARTIALLY PRECODED CSI-RS AND CSI FEEDBACK," U.S. Provisional Patent Application No. 62/208,252 filed Aug. 21, 2015 and entitled "DOWNLINK SIGNALING FOR PARTIALLY PRECODED CSI-RS AND CSI FEEDBACK," U.S. Provisional Patent Application No. 62/204,107 filed Aug. 12, 2015 and entitled "DOWNLINK SIGNALING FOR PARTIALLY PRECODED CSI-RS AND CSI FEEDBACK," U.S. Provisional Patent Application No. 62/173,611 filed Jun. 10, 2015 and entitled "DOWNLINK SIGNALING FOR PARTIALLY PRECODED CSI-RS AND CSI FEEDBACK," U.S. Provisional Patent Application No. 62/113,752 filed Feb. 9, 2015 and entitled "DOWNLINK SIGNALING FOR PARTIALLY PRECODED CSI-RS AND CSI FEEDBACK," and U.S. Provisional Patent Application No. 62/086,488 filed Dec. 2, 2014 and entitled "DOWNLINK SIGNALING FOR PARTIALLY PRECODED CSI-RS AND CSI FEEDBACK." The above-identified patent documents are incorporated herein by reference.

TECHNICAL FIELD

The present disclosure relates generally to channel state information in wireless communications systems, and more specifically to configuration of channel state information resources.

BACKGROUND

Frequency division, multiple input multiple output (FD-MIMO) communications systems proposed for Long Term Evolution (LTE) enhancements typically use large, two-dimensional (2D) antenna arrays. The channel state information (CSI) feedback framework and structure for such systems should be high-performance, flexible, and scalable with respect to the number and geometry of transmit antennas.

SUMMARY

User equipment (UE) is configured to receive two types of channel state information (CSI) reference signals (CSI-RS), the first containing more antenna ports and measured less often than the second. A first CSI report is based on first type CSI-RS and a second CSI report on the second type CSI-RS. The second type CSI-RS is at least partially precoded in response to the first CSI report, is precoded for the specific UE, and is transmitted more often than the first type CSI-RS, while the first type CSI-RS is not precoded. The first CSI report contains a first precoding matrix indicator (PMI) parameter and the second CSI report contains only a second PMI parameter of a two-PMI codebook, where the first PMI parameter is a long-term and wideband PMI. The first PMI is derived from measuring the first type CSI-RS in a plurality of subframes and resource blocks.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, where such a device, system or part may be implemented in hardware that is programmable by firmware or software. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
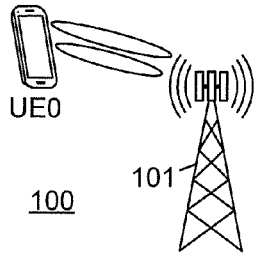
FIG. 1 illustrates an exemplary wireless communication system that may employ channel state information based on based on antenna mapping and/or array pattern subsampling according to some embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

A description of exemplary embodiments of the present disclosure is provided below. The text and figures of that description are provided solely as examples to aid the reader in understanding the disclosure, and are not intended and are not to be construed as limiting the scope of this disclosure in any manner. Although certain embodiments and examples have been provided, it will be apparent to those skilled in the art based on the description and figures herein that changes in the embodiments and examples shown may be made without departing from the scope of this disclosure. Aspects, features, and advantages of the scheme of the present disclosure are readily apparent from the following detailed description, simply by illustrating a number of particular embodiments and implementations. The scheme of the present disclosure is also capable of other and different embodiments, and its several details can be modified in various obvious respects, all without departing from the spirit and scope of the disclosure. Accordingly, the drawings and description are to be regarded as illustrative in nature, and not as restrictive. The scheme of the present disclosure is illustrated by way of example, and not by way of limitation, in the figures of the accompanying drawings. Therefore, this disclosure covers not only the specific embodiments disclosed in the description herein, but also any other variation and/or combination of any subset of the methods and structures described that is conceivable by those familiar with the art.

The following standards are incorporated herein by reference: 3GPP TS36.211 (2014-09); 3GPP TS36.212 (2014-09); and 3GPP TS36.213 (2014-09).

List of Acronyms
2D: two-dimensional
MIMO: multiple-input-multiple-output
SU-MIMO: single-user MIMO
MU-MIMO: multi-user MIMO
3GPP: 3rd Generation Partnership Project
LTE: long-term evolution
UE: user equipment
eNB: evolved Node B or eNodeB
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identifier
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure
SINR: signal-to-interference-plus-noise ratio
CW: codeword
D-BCH: dynamic broadcast channel
FDD: frequency division duplex
FD-MIMO: frequency division, multiple input, multiple output
C-RNTI: cell radio network temporary identifier The need exists for a high-performance, scalable (with respect to the number and geometry of transmit antennas), and flexible CSI feedback framework and structure for LTE enhancements when FD-MIMO (the use of large two-dimensional antenna arrays). To achieve high performance, more accurate CSI (in terms of a quantized MIMO channel) is needed at the eNodeB, especially for frequency division duplex (FDD) scenarios. The previous LTE (e.g., Rel. 12) precoding framework (a PMI-based feedback approach) may need to be replaced. However feeding back the quantized channel coefficients may be excessive in terms of feedback requirements. Accordingly, in this disclosure, the following properties of FD-MIMO are factored in for the schemes proposed:

Closely spaced, large 2D antenna arrays (primarily geared toward high beamforming gain rather than spatial multiplexing) are used, along with relatively small angular spread for each UE. This allows "compression" or "dimensionality reduction" of the quantized channel feedback based on a fixed set of basis functions/vectors/precoders.

The target scenario for FD-MIMO is low mobility. This allows for the possibility to update channel quantization parameters (such as the channel angular spreads) at a low rate, e.g., using UE-specific higher-layer signaling. In addition, CSI feedback can also be performed cumulatively.

On top of an efficient precoding scheme, the above features can be exploited for an efficient use of channel state information reference signal (CSI-RS) resources.

For such need, a scalable and FDD-enabling CSI feedback scheme may be devised for FD-MIMO, where the downlink channel is quantized according to a finite set of basis functions/vectors/precoders to reduce the number of coefficients that need to be quantized and reported from a UE to the eNodeB. One high-level idea of the proposed scheme is as follows (assuming the use of 2D antenna array):

From the UL signal reception (e.g. UL-SRS, UL-DMRS), the eNodeB measures the AoA spread associated with each UE, denoted as $[\theta_{min}, \theta_{max}]$ and/or $[\phi_{min}, \phi_{max}]$ in the elevation (zenith) and/or azimuthal dimensions, respectively. Alternatively, each UE may perform AoD profile measurement and report those values to the eNodeB via an uplink feedback channel.

Based on this information, the eNodeB may configure each of the UEs for reduced CSI feedback.

In addition to providing an efficient CSI feedback scheme, the use of such a finite set of basis functions/vectors/precoders also allows saving in CSI-RS resources by means of partially precoded CSI-RS. Still further, UE-specific precoding for CSI-RS allows improved CSI-RS coverage, which is essential for higher frequency deployments. To efficiently support this functionality, an efficient configuration and DL control signaling strategy is useful.

For CSI feedback, advantages of the scheme described herein include:

Compared to direct channel quantization: overhead reduction from quantizing NTXA coefficients to a significantly smaller number through subspace reduction, as described above.

It is also possible to derive the basis functions/vectors/precoders at the UE using, e.g., eigen-value decomposition (EVD) or singular-value decomposition (SVD)

and feed them back to the eNodeB. However, EVD/SVD precoders are known to be sensitive to error (such as unintentional signal space cancellation) even when regularization is employed. Accordingly, a fixed set of basis functions/vectors/precoders tends to be more robust.

The above concept can be extended for CSI-RS where CSI-RS ports are precoded or partially precoded in a UE-specific manner. For CSI-RS resource management and configuration, advantages of the scheme described herein include:

Partially precoded CSI-RS allows saving in CSI-RS resources that are assigned per UE.

Compared to EVD/SVD based method(s) for precoding CSI-RS, the proposed scheme allows the eNodeB to use the same master-set of basis functions/vectors/precoders for all the UEs. So the master-set is common for all the UEs while the subset is UE-specific. This is not possible for EVD/SVD, for which the master-set is UE-specific. This feature facilitates less complex implementation and resource allocation.

The proposed DL control signaling allows significant flexibility in reducing the amount of CSI-RS resources.

FIG. 1 illustrates a wireless communication system that may employ channel state information based on antenna mapping and/or array pattern subsampling according to some embodiments of the present disclosure. In the exemplary communications system 100 depicted, user equipment (UE) UE0 receives streams from evolved Node B (eNB) 101. eNB 101 multiplexes data streams intended for multiple UEs. The communication system thus consists of a downlink (DL), where signals are transmitted from eNB, base station (BS), NodeBs or transmission point (TP) to user equipment, and an uplink (UL), where signals are transmitted from UE to BS or NodeB. A UE, also commonly referred to as a terminal or a mobile station, may be fixed or mobile and may be a cellular phone, a personal computer device, etc. An eNB, which is generally a fixed station, may also be referred to as an access point or other equivalent terminology. DL signals include data signals conveying information content, control signals conveying DL Control Information (DCI), and Reference Signals (RS), which are also known as pilot signals. The eNB transmits data information or DCI through respective Physical Downlink Shared CHannels (PDCCHs) or Physical Downlink Control CHannels (PDCCHs). The eNB may transmit one or more of multiple types of RS including a UE-Common RS (CRS), a Channel State Information RS (CSI-RS), and a DeModulation RS (DMRS).

Figure 1A:
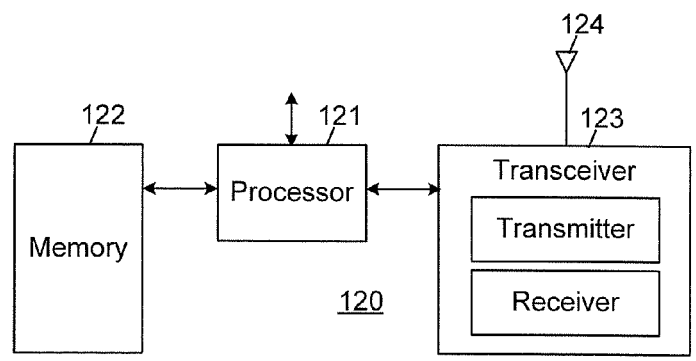
FIG. 1A depicts further details regarding the exemplary system of FIG. 1.

As shown in further detail in FIG. 1A, each system 120 for the UE (UE0) depicted in FIG. 1 and other, similar UEs (not shown) and for the eNB 101 depicted in FIG. 1 and other, similar eNBs (not shown) include: a processor 121, a memory 122, a transceiver 123 including a transmitter and a receiver, and an antenna array 124. The receiver and the transmitter (or transceiver 123) are each coupled to the antenna array for receiving or transmitting wireless signals, including reference signals such as CSI-RS. The controller or processor 121 is coupled to the receiver and the transmitter and performs one or more of the various computations or determinations described in further detail below, such as estimating one or more channels between the respective UE and the base station, deriving channel quality information for the channels using the reference signals and one or more of the processes described below, reporting at least the CQI and one or more indicators of precoding matrix selection(s) or antenna array subsampling parameters as described in further detail below, transmitting feedback including the CQI and/or PMI report as discussed in further detail below.

Figure 1B:
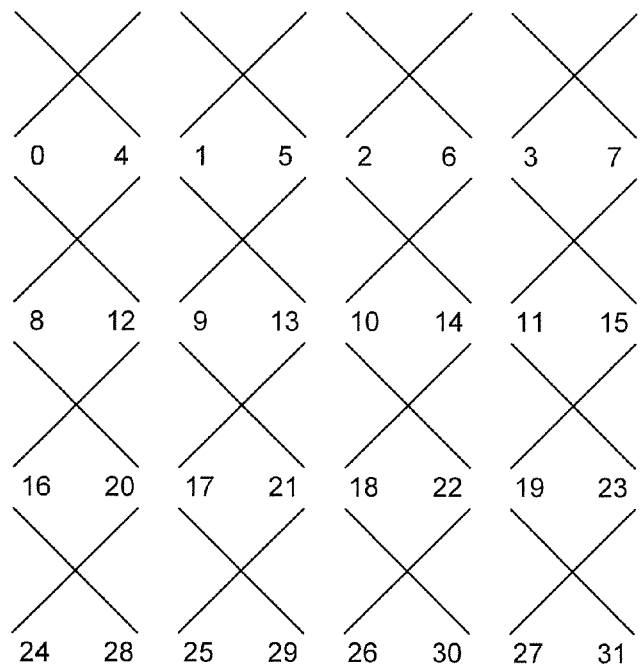
FIG. 1B depicts details of an antenna system for the exemplary system of FIG. 1.

FIG. 1B depicts an exemplary 2D antenna array for, e.g., the eNB 101, constructed from 16 dual-polarized antenna elements arranged in a 4×4 rectangular format. In this example, each labelled antenna element is logically mapped onto a single antenna port. In general, one antenna port may correspond to multiple antenna elements (physical antennas) combined via a virtualization. This 4×4 dual polarized array can then be viewed as 16×2=32-element array of elements. The vertical dimension (consisting of 4 rows) facilitates elevation beamforming while the horizontal dimension (consisting of 4 columns of dual polarized antennas) facilitates azimuthal beamforming across those elements. MIMO precoding in Rel. 12 LTE standardization (per TS36.211 section 6.3.4.2, 6.3.4.4, and TS36.213 section 7.2.4) was largely designed to offer precoding gain for one-dimensional antenna array. While fixed beamforming (i.e., antenna virtualization) can be implemented across the elevation dimension, it is unable to reap the potential gain offered by the spatial and frequency selective nature of the channel.

In Rel. 12 LTE, MIMO precoding (for spatial multiplexing) can be performed either with CRS (cf. TS36.211 section 6.3.4.2) or UE-RS (cf. TS36.211 section 6.3.4.4). In either case, each UE operating in spatial multiplexing mode(s) is configured to report CSI that may contain PMI (i.e. precoding codebook index). The PMI report is derived from one of the following sets of standardized codebooks:

Two antenna ports: {TS36.211 table 6.3.4.2.3-1};

Four antenna ports: {TS36.211 table 6.3.4.2.3-2} or {TS36.213 table 7.2.4-0A, B, C, and D}; or Eight antenna ports: {TS36.213 table 7.2.4-1, 2, 3, 4, 5, 6, 7, and 8}.

If the eNodeB follows the UE's PMI recommendation, the eNodeB is expected to precode its transmitted signal according to the recommended precoding vector/matrix (for a given subframe and PRB). Regardless of whether the eNodeB follows the UE's recommendation, the UE is configured to report a PMI according to the above precoding codebooks. Here a PMI (which may consist of a single index or a pair of indices) is associated with a precoding matrix W of size $N_C \times N_L$, where $N_C$ is the number of antenna ports in one row (=number of columns) and $N_L$ is the number of transmission layers. As the number of antenna elements increase (e.g., up to 8 rows of four dual-polarized antennas, which amounts to 64 elements), significantly larger precoding codebooks are needed. In addition, as MU-MIMO becomes a dominant scheduling strategy, obtaining a good multi-user pairing from single-user PMIs (received from the active UEs) has proved to be challenging. Hence, the Rel. 12 LTE CSI feedback paradigm limits the potential of FD-MIMO, especially in FDD scenarios where channel reciprocity is limited to long-term channel statistics at best.

In addition, CSI-RS resources are expensive and must be managed efficiently. It is therefore desirable to reduce the number of CSI-RS resources per UE in addition to improving CSI-RS coverage.

Therefore, for FD-MIMO, which utilizes 2D antenna array (hence 2D precoding), the need for high-performance, scalable (with respect to the number and geometry of transmit antennas), and flexible CSI feedback framework and structure (in addition to efficient utilization of CSI-RS resources) is evident. To achieve high performance, more accurate CSI (preferably in terms of quantized MIMO channel) is needed at the eNodeB. This is especially the case for FDD scenarios where short-term reciprocity is infeasible. In this case, the previous LTE (e.g. Rel. 12) precoding framework (PMI-based feedback) may need to be replaced. Yet feeding back the quantized channel coefficients may be excessive in terms of feedback requirements.

In this disclosure, the following properties of FD-MIMO are factored in for our proposed schemes:

The use of closely spaced large 2D antenna arrays (primarily geared toward high beamforming gain rather than spatial multiplexing) along with relatively small angular spread for each UE: This allows "compression" or "dimensionality reduction" of the quantized channel feedback. In this case, a set of basis functions/vectors/ precoders is used and quantization is basically expressing the MIMO channel in terms of a linear combination of those basis functions/vectors/precoders.

Low mobility as the target scenario for FD-MIMO: This allows the possibility to update quantization parameters (long-term channel statistics such as channel angular spread) at a low rate, e.g., using UE-specific higher-layer signaling. In addition, CSI feedback can also be performed cumulatively.

This property can in turn be used to perform precoding on CSI-RS. This facilitates more efficient utilization of CSI-RS resource since the number of CSI-RS ports per UE may be reduced and/or CSI-RS coverage may be improved.

While time-varying basis functions/vectors/precoders can be used (e.g. derived from EVD or SVD and fed back from the UE to the eNodeB), small channel angular spread warrants the use of a fixed master-set of basis functions/vectors/precoders derived primarily from the channel angular spread characteristics. For a given channel angular spread characteristic, a subset of the fixed master-set (pre-known both at the UE and the eNodeB) is chosen by the eNodeB and signaled to the UE.

In this framework, the overall TX precoder associated with each of the UEs (say, UE-n) can be written as follows:

$$W = W_L V \quad (1)$$

Assuming that the total number of TX antennas (at the eNodeB) is $N_{TX}$ and the transmission rank (the number of transmission layers) is $N_L$, the size of the precoder matrix W is $N_{TX} \times N_L$. For a dual-polarized array like that depicted in FIG. 1, with $N_r$ rows and $N_c$ columns, the number of TX antennas is $N_{TX} = 2 N_r N_c$. This precoder can be either a channel representation (such as channel quantization of $H^{(q,f)}$, that is, the channel associated with the q-th RX antenna and the f-th subband) or a precoder/beamformer representation (such as a vector or matrix corresponding to eigenvector(s)). In the second case, the precoder may be computed either assuming a single-user (SU) or a multi-user (MU) transmission hypothesis. Here $W_L$ denotes the long-term component associated with the aforementioned AoD profile (which consists of a subset of basis vectors/functions) and V the short-term component associated with a linear transformation of the long-term component (such as a linear combination and/or selection of the subset of basis functions/vectors/precoders). The long-term precoder $W_L$ is also a wideband precoder. That is, for the purpose of CSI reporting, a UE calculates one recommended $W_L$ assuming transmission on all the set S subbands or all the subbands within a configured system bandwidth. The short-term precoder V can be either wideband or subband precoder. Subband precoder means that, for the purposes of CSI reporting, a UE calculates one recommended $W_L$ assuming transmission for each subband within the set S subbands or within a configured system bandwidth.

The corresponding CSI feedback scheme is disclosed in U.S. Non-Provisional patent application Ser. No. 14/593,711 filed Jan. 19, 2015 and entitled "CHANNEL STATE INFORMATION REPORTING WITH BASIS EXPANSION FOR ADVANCED WIRELESS COMMUNICATIONS SYSTEMS," the content of which is incorporated herein by reference. A CSI-RS resource utilization scheme (partially precoded CSI-RS) based on the above properties is disclosed in U.S. Non-Provisional patent application Ser. No. 14/800,305 filed Jul. 15, 2015 and entitled "METHOD AND APPARATUS FOR PRECODING CHANNEL STATE INFORMATION REFERENCE SIGNAL," the content of which is incorporated herein by reference. Two embodiments of the latter disclosure can be summarized as follows:

Method 1: When DL AoD profile estimate (angular spread and mean/median, or AoD distribution) is available at the eNodeB, CSI-RS ports are precoded according to the estimated DL AoD profile. The resulting precoded CSI-RS resource occupies a smaller number of ports due to the subset selection.

This is especially relevant when UL-DL long-term reciprocity holds, such as when the UL-DL duplex distance is not too large.

Method 2: When DL AoD profile estimate is unavailable, CSI-RS ports are precoded according to a predetermined subset for a given subframe. The resulting precoded CSI-RS resource also occupies a smaller number of ports.

This is especially relevant when UL-DL long-term reciprocity does not hold such as when the UL-DL duplex distance is too large.

In this disclosure, precoded CSI-RS or partially precoded CSI-RS refers to CSI-RS transmitted by a serving eNodeB to at least one UE where the associated CSI-RS ports are formed by applying a precoder or a beamformer and thus fewer in number compared to a previously non-precoded CSI-RS. In this disclosure, the precoder or beamformer applied on. CSI-RS ports is not the same as that applied to data channel or data signals. For this reason, it can also be termed beamformed CSI-RS.

Figure 2:
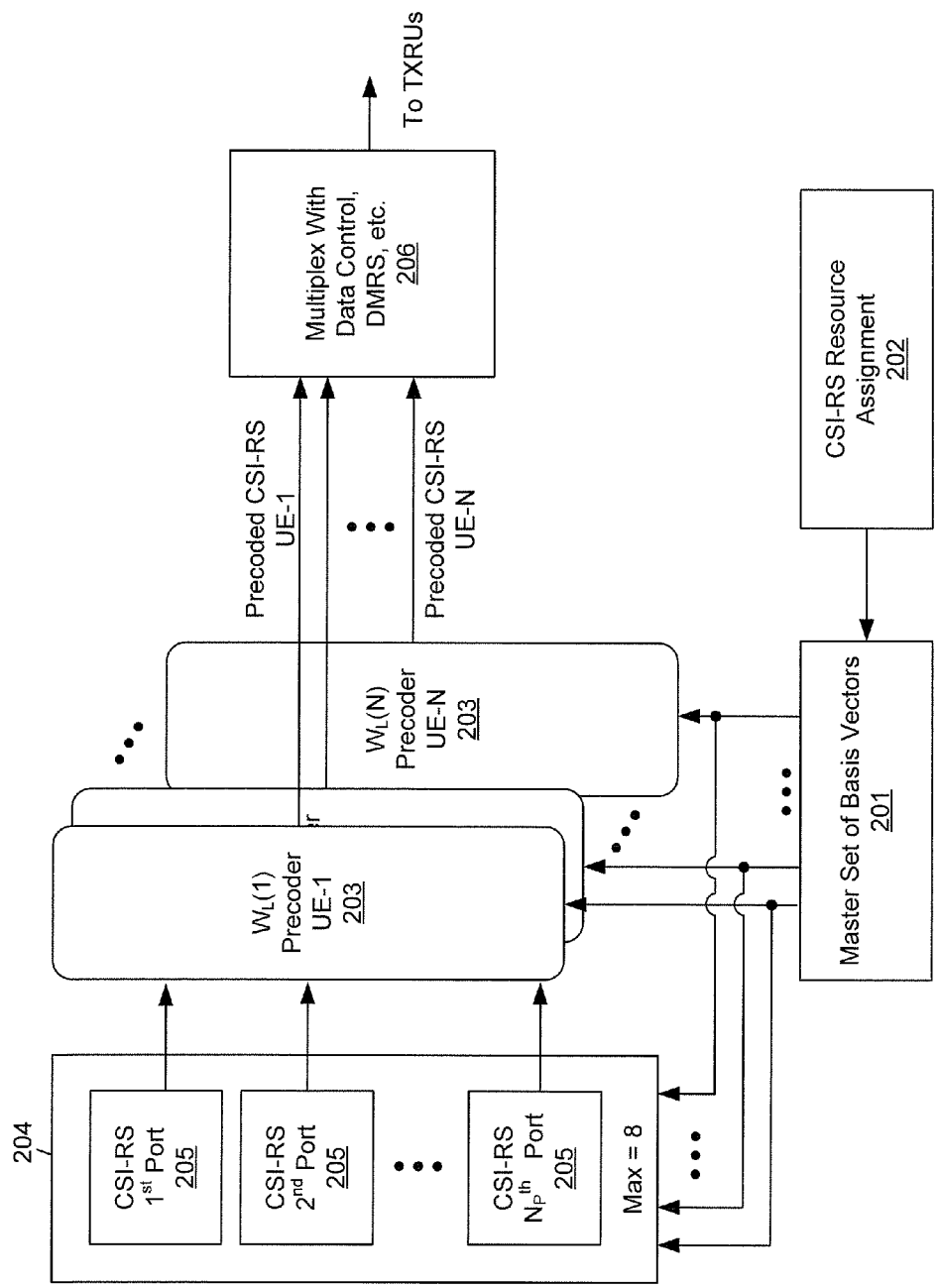
FIG. 2 depicts a proposed CSI-RS resource utilization scheme according to embodiments of the present disclosure.

FIG. 2 depicts the proposed CSI-RS resource utilization scheme for methods 1 and 2 described above. Here a common master-set of basis vectors 201 for a rectangular antenna array and DFT-based Kronecker codebook is shared by all the UEs served at a given eNodeB. Then, depending on the basis selection criteria, which may be UE-specific or group-specific and may also be based on long-term channel statistics or fixed assignments, a CSI-RS resource assignment method 202 (e.g., method 1 or method 2 described above) is employed to select a subset of basis functions/ vectors/precoders for each of the UEs and to form CSI-RS precoders 203 for each UE (UE-1 through UE-N). The precoders 203 operate on CSI-RS signals from a set 204 of CSI-RS antenna ports 205 to form precoded CSI-RS for each UE. The precoded CSI-RS are received by a multiplexing unit 206 with data control and DMRS, for forwarding to the transceiver units (TXRUs) of the antenna array.

In this disclosure, several alternatives for DL signaling mechanisms and CSI-RS resource allocation which facilitates the use of partially precoded CSI-RS (along with its associated precoding) are proposed. This includes higher layer signaling as well as control signaling. Aspects, features, and advantages of the disclosure are readily apparent from the following detailed description, simply by illustrating a number of particular embodiments and implementations. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings. Therefore, this disclosure covers not only the specific embodiments disclosed in the description and drawings, but also any other variation and/or combination of any subset of the above methods that is conceivable by those familiar with the art.

The exemplary descriptions operate under the following premises:

Premise 1—maintain the LTE Rel. 12 constraint of the maximum number of CSI-RS ports=8; and Premise 2—however, the number of TXRUs at the eNodeB (=M) may be more than 8.

In general, premise 1 can be relaxed if the maximum number of CSI-RS ports, especially non-precoded CSI-RS, is increased beyond 8.

Figure 3:
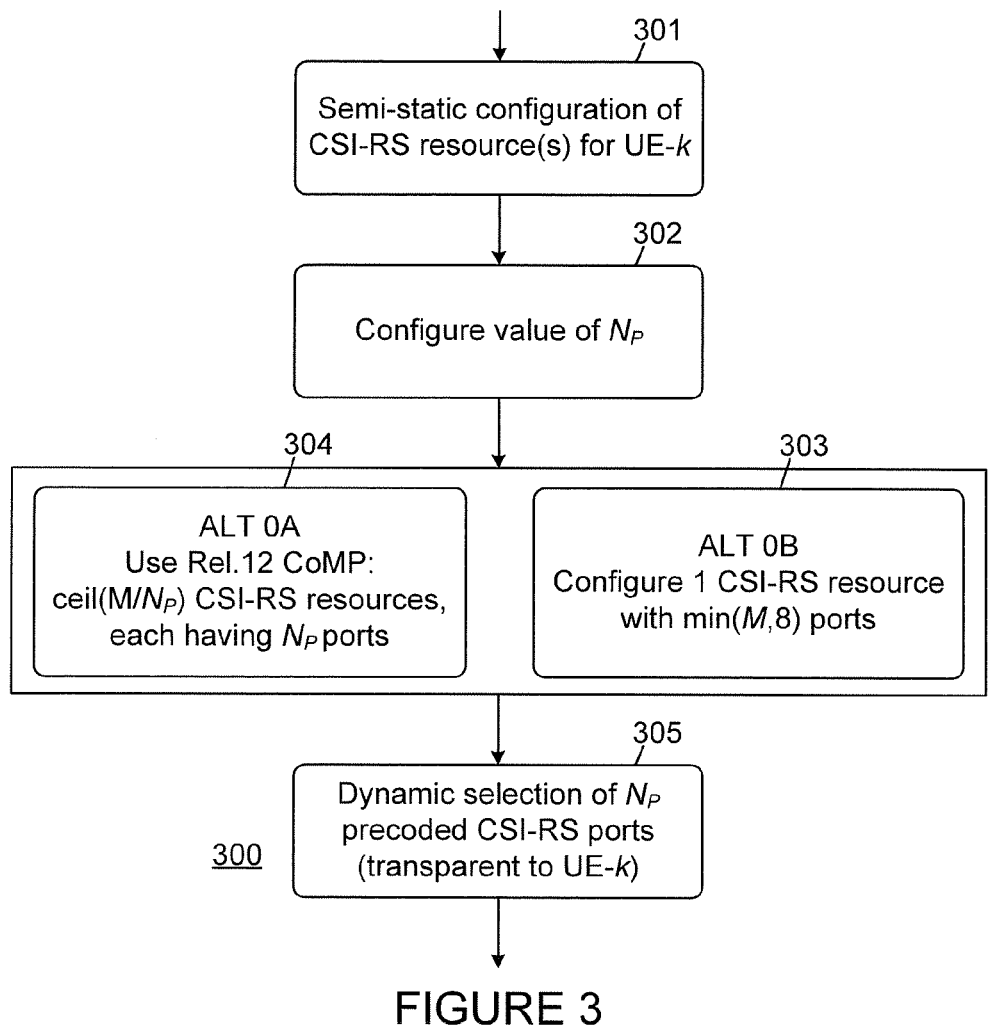
FIG. 3 is a high level flow diagram illustrating partial precoding of CSI-RS according to a first embodiment of the present disclosure.

FIG. 3 is a high level flow diagram illustrating partial precoding of CSI-RS according to a first embodiment (Alt0) of the present disclosure, without using DL control signaling. The process depicted is executed in a controller or processor within, for example, an eNodeB. Here it is assumed that UL-DL long-term reciprocity is present. Hence, the long-term DL channel statistics needed to derive $W_L$ can be measured at the eNodeB using at least one UL signal. The eNodeB procedure 300 for the first embodiment can be described as follows for a given UE-k among N UEs served at the eNodeB:

Step 1: The eNodeB configures (block 301) CSI-RS resource(s) for UE-k. This configuration is performed semi-statically (e.g., via RRC signaling). This configuration is analogous to Rel. 12 CSI-RS resource configuration. That is, each resource is characterized by a time-frequency pattern (time/RE shift, periodicity) and antenna port assignment (starting with antenna port 15). Here min(M, 8) ports (or another number of ports which represents the maximum number of ports) are configured for each CSI-RS resource. In addition, the eNodeB configures (block 302) for UE-k a value for the subset size parameter $N_P$ (the number of ports in each subset $N_P < M$) via RRC signaling (higher layer). In this case, $N_P$ is fixed within a certain period of time (until the RRC configuration is updated). Two sub-alternatives exist for configuring the CSI-RS resources:

Alt 0B: The eNodeB configures (block 303) UE-k with a CSI-RS resource (via RRC), where the number of ports is included, that is, min(M, 8) ports (or another number of ports which represents the maximum number of ports). Based on the current setting, the allocation always starts with antenna port number 15, followed by antenna port 16, etc., up to 15+min(M, 8)−1 (or 14+another number of ports which represents the maximum number of ports). Alternatively, it is possible to define a more flexible CSI-RS port index allocation which does not start at 15, but such modifications would be routine.

Alt 0A: Reuse the Rel. 12 CoMP framework by configuring UE-k (block 304) with $\lceil M/N_P \rceil$ CSI-RS resources, each with $N_P$ CSI-RS ports. It is also possible to allocate $\geq \lceil M/N_P \rceil$ ports if the dynamic assignment involves some overlapping ports among different CSI-RS resources. In this case, it is possible that an increase may be necessary of the maximum number of CSI-RS resources that can be assigned to a given UE in Rel. 12.

Step 2: At the eNodeB, rate matching is performed (block 305) assuming the "dynamic" configuration of the CSI-RS ports (assuming only $N_P$ ports, rather than the RRC-configured M ports), to avoid wasting REs. This type of "dynamic" rate matching has been performed for CoMP (non-zero power or "NZP"/zero power or "ZP" CSI-RS). This may not apply for semi-persistent scheduling (SPS).

Step 3: Anticipating UE-k to report aperiodic CSI in subframe n+D (D=4 in FDD), the eNodeB precodes all the TXRUs and forms $N_P$ CSI-RS ports. This may be performed as illustrated in FIG. 2. The total number of precoded CSI-RS ports $N_P$ can be associated with either one or more than one two-dimensional CSI-RS port pattern. This association can be a static (fixed) configuration or semi-static (configured via higher layer signaling) configuration. If more than one two-dimensional pattern is available for a given number of ports, an additional parameter can be signaled to a UE.

Step 4: Although UE-k is configured with a maximum of min(M, 8) CSI-RS ports (or another number of ports which represents the maximum number of ports), UE-k expects to receive (decode) only $N_P$ CSI-RS ports as instructed by the associated UL grant (for the triggered CSI report). Based on the channel measurement from the $N_P$ ports, UE-k sends a CSI report, e.g. linear combination or selection of the $N_P$ ports (captured in a PMI). Here, the chosen size-$N_P$ subset out of min(M, 8) ports or another number of ports is transparent to UE-k. UE-k only needs to know the value of $N_P$, but not which $N_P$ out of min(M, 8) ports (or another number of ports which represents the maximum number of ports) are assigned by the eNodeB.

Figure 4:
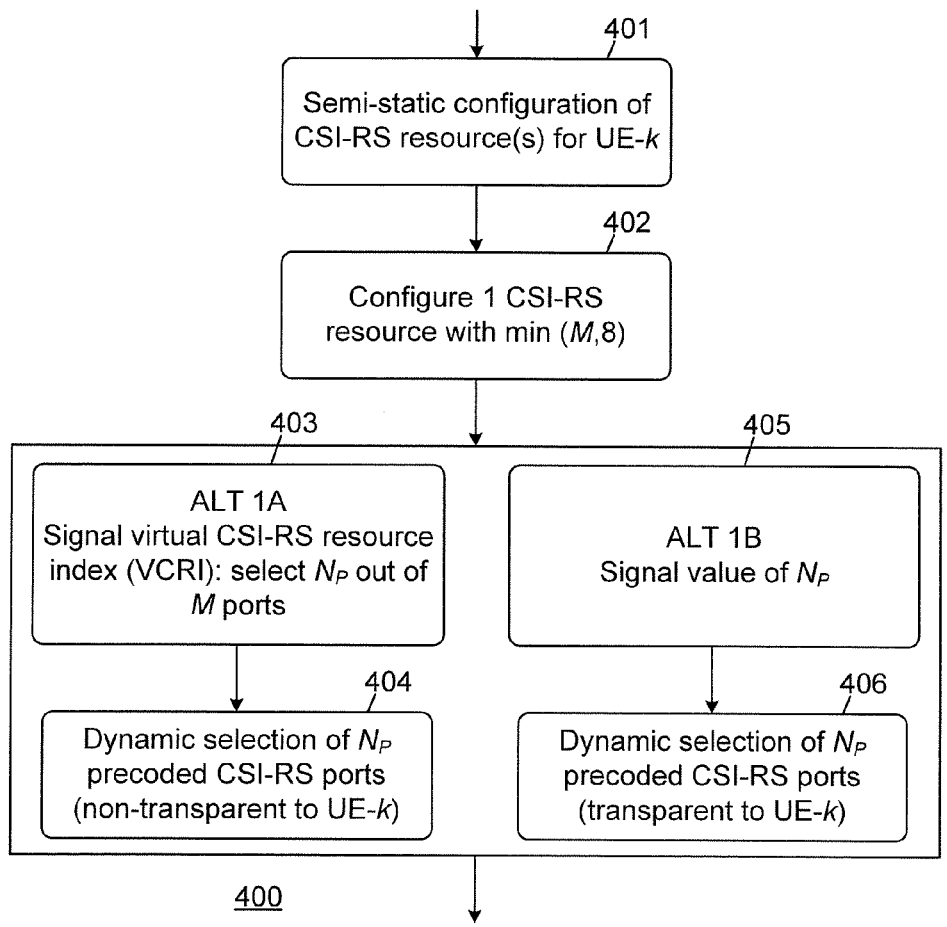
FIG. 4 is a high level flow diagram illustrating partial precoding of CSI-RS according to a second embodiment of the present disclosure.

FIG. 4 is a high level flow diagram illustrating partial precoding of CSI-RS according to a second embodiment (Alt1) of the present disclosure, with use of DL control signaling. Here, it is again assumed that UL-DL long-term reciprocity is present and hence the long-term DL channel statistics needed to derive $W_L$ can be measured at the eNodeB using at least one UL signal. The eNodeB procedure 400 for the second embodiment can be described as follows for a given UE-k:

Step 1: The eNodeB configures (block 401) CSI-RS resource(s) for UE-k. This configuration is performed semi-statically (e.g., via RRC signaling). This configuration is analogous to Rel. 12 CSI-RS resource configuration. That is, each resource is characterized by a time-frequency pattern (time/RE shift, periodicity) and antenna port assignment (starting with antenna port 15). Here min(M, 8) ports (or another number of ports which represents the maximum number of ports) are configured for each CSI-RS resource. In subframe n, the eNodeB triggers an aperiodic CSI report from UE-k (using a new DCI format for UL grant), which indicates a subset of the configured CSI-RS ports (block 402). A bitmap or an indicator field (length depending on the subset size $N_P$ as a function of M) may be used. The total number of precoded CSI-RS ports $N_P$ may be associated with either one or more than one two-dimensional CSI-RS port pattern. This association can be a static (fixed) configuration or semi-static (configured via higher layer signaling) configuration. If more than one two-dimensional pattern is available for a given number of ports, an additional parameter can be signaled to a UE.

Alt 1A: The eNodeB signals (block 403) the size-$N_P$ subset of M possible ports. When M>8, a new indicator may be employed for such signaling based on a Virtual CSI-RS Resource Index (VCRI). VCRI is defined to accommodate the spatial resolution allowed by the number of TXRUs (which could be more than 8, such as 64). Here a mapping between CSI-RS port index (15, 16, . . . , 22) and VCRI may need to be defined. Alternatively, VCRI can be defined based on the number of TXRUs at the eNodeB. In this case, the mapping between VCRI and CSI-RS port index can be viewed as an implementation issue. The chosen size-$N_P$ subset out of min(M, 8) ports or another number of ports which represents the maximum number of ports is not transparent to UE-k (block 404). UE-k will know not only the value of $N_P$, but also which $N_P$ out of min(M, 8) ports (or another number of ports which represents the maximum number of ports) are assigned by the eNodeB.

Alt 1B: The eNodeB signals (block 405) the number of CSI-RS antenna ports ($=N_P$) to the UE-k. If this is done, the choice of subset is transparent to UE-k (block 406). In this case $N_P$ is not configured via higher layer (RRC signalling) since $N_P$ can be changed dynamically (i.e., adapting to AoD spread). Hence, the Rel. 12 CoMP based solution does not apply (since $N_P$ is not semi-static). Here, the chosen size-$N_P$ subset out of min(M, 8) ports or another number of ports which represents the maximum number of ports is transparent to UE-k. UE-k only needs to know the value of $N_P$, but not which $N_P$ out of min(M, 8) ports (or another number of ports which represents the maximum number of ports) are assigned by the eNodeB.

Step 2: At the eNodeB, rate matching is performed assuming the "dynamic" configuration of the CSI-RS ports (assuming only $N_P$ ports, rather than the RRC-configured M ports) to avoid wasting REs. This type of "dynamic" rate matching has been performed for CoMP (NZP/ZP CSI-RS). This may not apply for SPS (semi-persistent scheduling).

Step 3: Anticipating UE-k to report aperiodic CSI in subframe n+D (for instance, D=4 in FDD), the eNodeB precodes all the TXRUs and forms $N_P$ CSI-RS ports. This may be performed as illustrated in FIG. 2.

Step 4: Although UE-k is configured with a maximum of min(M, 8) CSI-RS ports (or another number of ports which represents the maximum number of ports), UE-k expects to receive (decode) only $N_P$ CSI-RS ports as instructed by the associated UL grant (for the triggered CSI report). Based on the channel measurement from the $N_P$ ports, UE-k sends a CSI report, e.g., linear combination or selection of the $N_P$ ports (captured in a PMI).

Yet a third embodiment (Alt 2) which does not assume UL-DL long-term reciprocity is proposed. The long-term DL channel statistics needed to derive $W_L$ are not measured at a serving eNodeB. Instead, a feedback from each of the UEs is needed to assist the eNodeB to choose $W_L$. This feedback can be either a recommended choice of $W_L$ or a quantized DL channel which can be used by the eNodeB to derive $W_L$. Overall, Alt2 is applicable for both Alt0 and Alt1. Another change needed (relative to the illustrations of FIG. 3 or FIG. 4) is as follows: To enable UE-k to report the aforementioned additional (longer-term) feedback, an additional CSI-RS resource with min(M, 8) ports (or a configured number of ports for such a CSI-RS resource) needs to be configured for UE-k so that UE-k may be able to measure the non-precoded channel, especially its long-term spatial profile. Therefore, this additional CSI-RS resource is not precoded and is associated with at least the same number of ports as the first (precoded) CSI-RS resource. This is needed to compute a recommended choice of $W_L$ or another form of feedback which may assist the eNodeB in computing $W_L$.

Since this additional CSI-RS resource is used to compute the long-term precoder or channel statistics, such a second CSI-RS can be transmitted with lower duty cycle (or with longer periodicity) compared to the first CSI-RS. There are at least two possible embodiments:

Alt 2A: A first, precoded CSI-RS transmitted with periodicity T1 milliseconds (ms) and a second, non-precoded CSI-RS transmitted with periodicity T2 (ms), where T1≤T2. For instance T2 can be made an integer (1, 2, 3, . . . ) multiple of T1. Each of these two CSI-RSs is assigned one CSI-RS resource. In one method, both CSI-RS resources are linked with one CSI process; in another method, the two CSI-RS resources are linked respectively with two separate CSI processes. The larger periodicity can be used to reduce CSI-RS overhead of non-precoded CSI-RS, which tends to have larger overhead than precoded CSI-RS. In relation to CSI feedback, the following two sub-embodiments are exemplary.

Alt 2A.1: The UE shall use the first CSI-RS to derive CSI for a first CSI process, which contains RI, CQI, and a PMI associated with precoder V. The UE shall use the second CSI-RS to derive CSI for a second CSI process, which contains a PMI associated with precoder $W_L$. This second CSI process contains configuration for the second PMI conveyed in the associated second CSI report. Upon receiving a PMI feedback associated with $W_L$ from UE-k, the eNodeB may choose to utilize this feedback to derive a long-term precoder for the first CSI-RS. Alternatively, the first CSI-RS (and hence the first CSI report) is associated with a first CSI-RS resource and the second CSI-RS (and hence the second CSI report) with a second CSI-RS resource. Both CSI-RS resources are associated with a same CSI process.

Alt 2A.2: The UE shall use the first CSI-RS to derive CSI for a first CSI process which contains CQI and a PMI associated with precoder V. The UE shall use the second CSI-RS to derive CSI for a second CSI process which contains RI and a PMI associated with precoder $W_L$. Upon receiving a PMI feedback associated with $W_L$ from UE-k, the eNodeB may choose to utilize this feedback to derive a long-term precoder for the first CSI-RS. Alternatively, the first CSI-RS (and hence the first CSI report) is associated with a first CSI-RS resource and the second CSI-RS (and hence the second CSI report) with a second CSI-RS resource. Both CSI-RS resources are associated with a same CSI process.

Alt 2A.3: The UE shall use the first CSI-RS to derive CSI for a first CSI process, which contains RI, CQI, and a PMI associated with precoder V. The UE shall use the second CSI-RS to derive CSI for a second CSI process which contains RI, CQI, and a PMI associated with precoder $W_L$. Upon receiving a PMI feedback associated with $W_L$ from UE-k, the eNodeB may choose to utilize this feedback to derive a long-term precoder for the first CSI-RS. Alternatively, the first CSI-RS (hence the first CSI report) is associated with a first CSI-RS resource and the second CSI-RS (hence the second CSI report) with a second CSI-RS resource. Both CSI-RS resources are associated with a same CSI process.

Alt 2A.4: The UE shall use the first CSI-RS to derive CSI for a first CSI process, which contains RI, CQI, and a PMI associated with precoder V. The UE shall use the second CSI-RS to derive CSI for a second CSI process which contains RI, CQI, a PMI associated with precoder $W_L$, and a PMI associated with precoder V. Upon receiving a PMI feedback associated with $W_L$ from UE-k, the eNodeB may choose to utilize this feedback to derive a long-term precoder for the first CSI-RS. Alternatively, the first CSI-RS (hence the first CSI report) is associated with a first CSI-RS resource and the second CSI-RS (hence the second CSI report) with a second CSI-RS resource. Both CSI-RS resources are associated with a same CSI process.

Alt 2B: A first precoded CSI-RS transmitted with periodicity T1 (ms) and a second non-precoded CSI-RS transmitted aperiodically. This aperiodic transmission of the second CSI-RS can be transmitted in conjunction (frequency-multiplexed within a same subframe) with an UL grant which triggers A-CSI. Alternatively, this second CSI-RS can be transmitted in response to a UE request. In one method, both CSI-RS resources are linked with one CSI process; in another method, the two CSI-RS resources are linked respectively with two separate CSI processes. Upon receiving the aperiodic CSI-RS, the UE derives corresponding CSI based upon the CSI-RS received within a single transmission instance of the CSI-RS, e.g., a single subframe; in other words, the UE shall not assume that the aperiodic CSI-RS are precoded with the same precoder across multiple transmission instances.

Alt 2B.1: The UE shall use the first CSI-RS to derive CSI for a first CSI process which contains RI, CQI, and a PMI associated with precoder V. The UE shall use the second CSI-RS to derive CSI for a second CSI process which contains a PMI associated with precoder $W_L$. Upon receiving a PMI feedback associated with $W_L$ from UE-k, the eNodeB may choose to utilize this feedback to derive a long-term precoder for the first CSI-RS. Alternatively, the first CSI-RS (hence the first CSI report) is associated with a first CSI-RS resource and the second CSI-RS (hence the second CSI report) with a second CSI-RS resource. Both CSI-RS resources are associated with a same CSI process.

Alt 2B.2: The UE shall use the first CSI-RS to derive CSI for a first CSI process which contains CQI and a PMI associated with precoder V. The UE shall use the second CSI-RS to derive CSI for a second CSI process which contains RI and a PMI associated with precoder $W_L$. Upon receiving a PMI feedback associated with $W_L$ from UE-k, the eNodeB may choose to utilize this feedback to derive a long-term precoder for the first CSI-RS. Alternatively, the first CSI-RS (hence the first CSI report) is associated with a first CSI-RS resource and the second CSI-RS (hence the second CSI report) with a second CSI-RS resource. Both CSI-RS resources are associated with a same CSI process.

Alt 2B.3: The UE shall use the first CSI-RS to derive CSI for a first CSI process, which contains RI, CQI, and a PMI associated with precoder V. The UE shall use the second CSI-RS to derive CSI for a second CSI process which contains RI, CQI, and a PMI associated with precoder $W_L$. Upon receiving a PMI feedback associated with $W_L$ from UE-k, the eNodeB may choose to utilize this feedback to derive a long-term precoder for the first CSI-RS. Alternatively, the first CSI-RS (hence the first CSI report) is associated with a first CSI-RS resource and the second CSI-RS (hence the second CSI report) with a second CSI-RS resource. Both CSI-RS resources are associated with a same CSI process.

Alt 2B.4: The UE shall use the first CSI-RS to derive CSI for a first CSI process, which contains RI, CQI, and a PMI associated with precoder V. The UE shall use the second CSI-RS to derive CSI for a second CSI process which contains RI, CQI, a PMI associated with precoder $W_L$, and a PMI associated with precoder V. Upon receiving a PMI feedback associated with $W_L$ from UE-k, the eNodeB may choose to utilize this feedback to derive a long-term precoder for the first CSI-RS. Alternatively, the first CSI-RS (hence the first CSI report) is associated with a first CSI-RS resource and the second CSI-RS (hence the second CSI report) with a second CSI-RS resource. Both CSI-RS resources are associated with a same CSI process.

In the above cases, the first CSI-RS is expected to occupy a smaller number of CSI-RS antenna ports than the second CSI-RS. When the first CSI-RS ends up being transmitted in the same subframe as the second CSI-RS, one of the following schemes (or a combination thereof) can be adopted:

Scheme 1: Use different frequency (RE mapping) pattern for the first and the second CSI-RS to avoid collision within the same subframe.

Scheme 2: If collision occurs within one subframe, one of the CSI-RSs shall be dropped. Which one of the two to be dropped shall be specified:

Scheme 2a: Drop the first CSI-RS (prioritize the second CSI-RS since, e.g. it is not transmitted as often); or Scheme 2b: Drop the second CSI-RS (prioritize the first CSI-RS)

Figure 5:
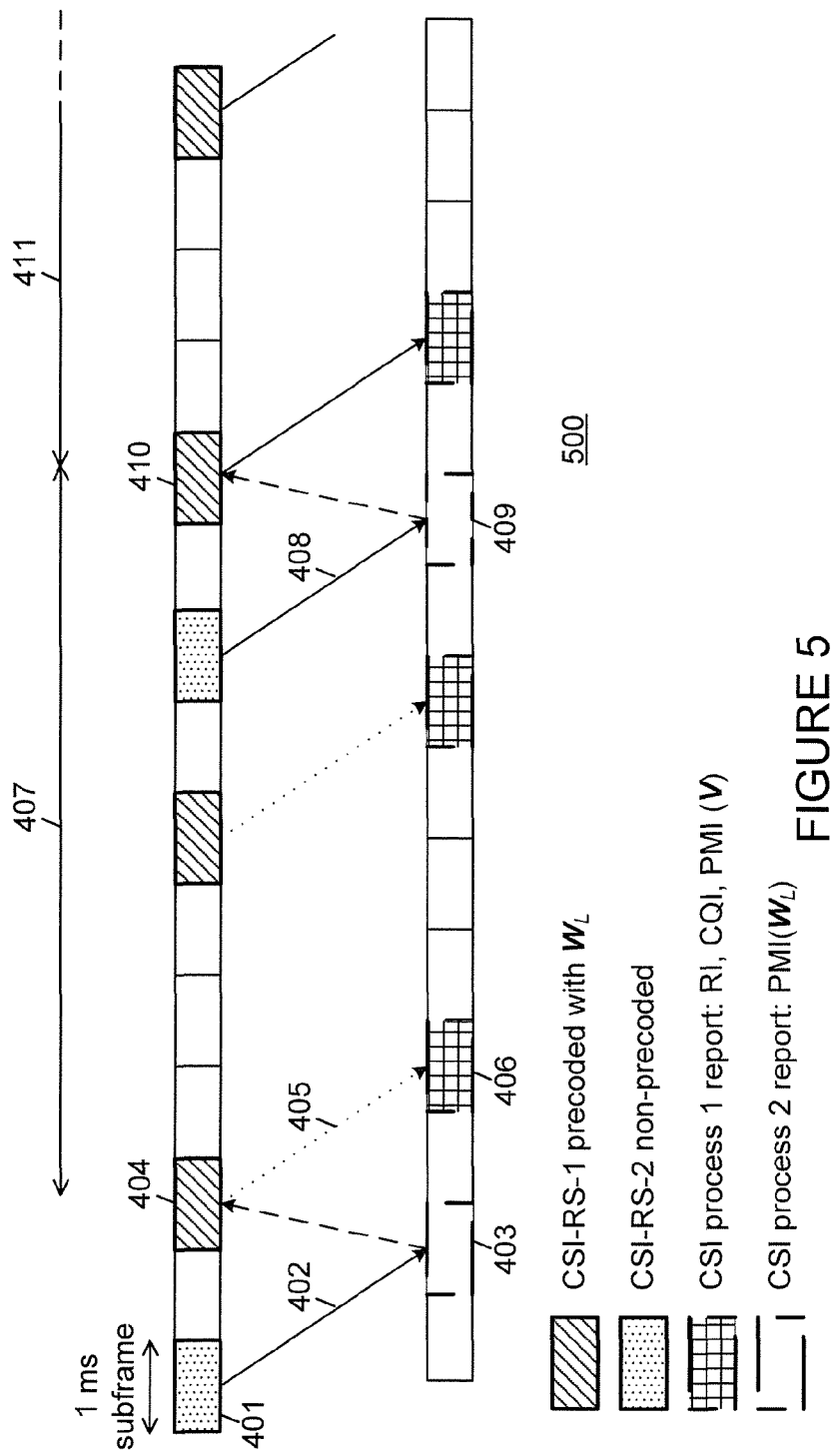
FIG. 5 is a timing diagram for hybrid use of non-precoded CSI-RS and precoded CSI-RS according to one embodiment of the present disclosure.

FIG. 5 is a timing diagram for hybrid use of non-precoded CSI-RS and precoded CSI-RS according to one embodiment of the present disclosure, with use of DL control signaling. FIG. 5 depicts timing 500 for an exemplary case of Alt 2 with Alt 2A as described above (assuming two CSI processes) used for illustration, where a UE is configured to measure two CSI-RSs. An analogous operation for other embodiments can be straightforwardly deduced by those familiar with the art. As depicted, non-precoded CSI-RS-2 (the first CSI-RS 401 in FIG. 5) is transmitted less frequently than precoded CSI-RS-1 (the second CSI-RS 404 in FIG. 5). As UE-k receives a DL subframe containing non-precoded CSI-RS-2 401, it measures 402 the non-precoded channel, including CSI-RS-2. Assuming that the same periodicity is used for CSI reporting (as in FIG. 5, although in general the periodicity of CSI-RS may be different from that of CSI feedback), UE-k reports a CSI 403 which contains at least one PMI value associated with $W_L$, PMI($W_L$)=x in the example shown. In addition, UE-k may optionally report at least one PMI value associated with V. Upon receiving the PMI report with PMI($W_L$)=x, the eNodeB determines/derives the long-term precoder $W_L$ that is used to precode CSI-RS-1 404. UE-k receives CSI-RS-1 (at a higher periodicity), measures 405 the precoded channel including CSI-RS-1, and reports (not shown in the diagram) a CSI 406 which contains RI, CQI, and at least one PMI value associated with V. The eNodeB precodes CSI-RS-1 with the decoded long-term precoder $W_L$ (i.e., PMI($W_L$)=x) during a subsequent period 407 until a next update involving measurement 408 using the non-precoded CSI-RS-2, a CSI report 409 which contains a new PMI value associated with $W_L$, PMI($W_L$)=y. The new PMI($W_L$)=y is used to precode CSI-RS-1 410 and other instances of CSI-RS-1 during a subsequent period 411.

Using the Rel. 12 LTE framework, $W_L$ feedback (accompanied with V) can use the existing W1-W2 feedback framework.

It is also possible to obviate the need for DL signaling of $N_P$ if the eNodeB is required (through standardization) to follow the UE-k recommendation. Then UE-k simply assumes a value of $N_P$ which is associated with the latest $W_L$ (or for the Rel. 12 framework, W1) feedback. This alternative, however, is atypical for LTE since the eNodeB does not necessarily follow UE recommendations.

As mentioned above, the two types of CSI-RS (a first CSI-RS and a second CSI-RS, or non-precoded and partially precoded CSI-RS) and their CSI reports can be associated with either two CSI processes (one for non-precoded, another for partially precoded, each CSI process containing one CSI-RS resource) or one CSI process (containing two CSI-RS resources, one for non-precoded, another for partially precoded). Some exemplary RRC configuration messages for these two alternatives are as follows. The names and enumerations (when applicable) of the new RRC parameters are exemplary and illustrative. Here "BF" stands for "beamformed," which represents precoded CSI-RS (also termed BF CSI-RS). Likewise, "NP" stands for non-precoded and represents non-precoded CSI-RS. In general, they represent a first CSI-RS and a second CSI-RS, or CSI-RS-1 and CSI-RS-2. Alternatively, these two types of CSI-RS can be differentiated from UE perspective by the use of CSI reporting type or class. For example, a class one or A can correspond to non-precoded CSI-RS and a class two or B can correspond to beamformed CSI-RS.

Two Separate CSI Processes

Not all the required RRC parameters are shown in the tables below, which illustrate programming within a controller or processor. The first example (TABLE 1A) introduces a new RRC parameter in CSI-Process-r13 (termed csi-RS-Type-r13 for illustrative purposes), which indicates whether a CSI process is associated with NP or BF CSI-RS. Therefore, csi-RS-Type-r13 is set to "np" in one CSI process and "bf" in another. In the second example (TABLE 1B), two types of CSI process are defined: CSI-Process-NP-CSI-RS-r13 (associated NP CSI-RS) and CSI-Process-BF-CSI-RS-r13 (associated BF CSI-RS). Since the two CSI processes are essentially independent, this embodiment allows full flexibility in configuring each type of CSI-RS at the expense of extra overhead.

TABLE 1A

Two separate processes, example 1
CSI-Process information elements

```
-- ASN1START
CSI-Process-r13 ::=        SEQUENCE {
    csi-ProcessId-r13          CSI-ProcessId-r13,
    csi-RS-ConfigNZPId-r13     CSI-RS-ConfigNZPId-r13,
    csi-RS-Type-r13            ENUMERATED {np, bf},
    csi-IM-ConfigId-r13        CSI-IM-ConfigId-r13,
    p-C-AndCBSRList-r13        SEQUENCE (SIZE (1..2)) OF P-C-AndCBSR-r13,
    cqi-ReportBothProc-r13     CQI-ReportBothProc-r13 OPTIONAL,-- Need OR
    cqi-ReportPeriodicProcId-r13   INTEGER (0..maxCQI-ProcExt-r13) OPTIONAL,--
        Need OR
    cqi-ReportAperiodicProc-r13    CQI-ReportAperiodicProc-r13 OPTIONAL,-- Need
        OR
    ...,
    ...
}
-- ASN1STOP
```

TABLE 1B

Two separate processes, example 2
CSI-Process information elements

```
-- ASN1START
CSI-Process-NP-CSI-RS-r13 ::=     SEQUENCE {
    csi-ProcessId-r13          CSI-ProcessId-r13,
    csi-RS-ConfigNZPId-r13     CSI-RS-ConfigNZPId-r13,
    csi-IM-ConfigId-r13        CSI-IM-ConfigId-r13,
    p-C-AndCBSRList-r13        SEQUENCE (SIZE (1..2)) OF P-C-AndCBSR-r13,
    cqi-ReportBothProc-r13     CQI-ReportBothProc-r13 OPTIONAL,-- Need OR
    cqi-ReportPeriodicProcId-r13   INTEGER (0..maxCQI-ProcExt-r13) OPTIONAL,--
        Need OR
    cqi-ReportAperiodicProc-r13    CQI-ReportAperiodicProc-r13 OPTIONAL,-- Need
        OR
    ...,
    ...
}
CSI-Process-BF-CSI-RS-r13 ::=     SEQUENCE {
    csi-ProcessId-r13          CSI-ProcessId-r13,
    csi-RS-ConfigNZPId-r13     CSI-RS-ConfigNZPId-r13,
    csi-IM-ConfigId-r13        CSI-IM-ConfigId-r13,
    p-C-AndCBSRList-r13        SEQUENCE (SIZE (1..2)) OF P-C-AndCBSR-r13,
    cqi-ReportBothProc-r13     CQI-ReportBothProc-r13 OPTIONAL,-- Need OR
    cqi-ReportPeriodicProcId-r13   INTEGER (0..maxCQI-ProcExt-r13) OPTIONAL,--
        Need OR
    cqi-ReportAperiodicProc-r13    CQI-ReportAperiodicProc-r13 OPTIONAL,-- Need
        OR
    ...,
    ...
}
-- ASN1STOP
```

A variation of the exemplary embodiment in TABLE 1A is as follows: Rather than defining a CSI-RS type parameter csi-RS-Type-r13, an indicator which defines a CSI reporting type (for illustrative purposes, csi-Report-Type-r13) or class (for illustrative purposes, csi-Report-Class-r13) is used. Therefore the two types or classes of CSI-RS (NP and BF) are implicitly differentiated by means of CSI reporting behavior pertaining to NP CSI-RS and BF CSI-RS. For example, when csi-Report-Type-r13 (or csi-Report-Class-r13) is set to a first value, a CSI report contains PMI values associated with a first stage and a second stage precoding. When csi-Report-Type-r13 (or csi-Report-Class-r13) is set to a second value, a CSI report contains at least one PMI value associated with only the second stage precoding. Using the Rel. 12 PMI conventions (codebook-based CSI reporting), if $\{i_{1,1}, i_{2,1}, i_{2,1}, i_{2,2}\}$ are the PMI values associated with $\{W_{L,V}, W_{L,H}, V_V, V_H\}$, when csi-Report-Type-r13 (or csi-Report-Class-r13) is set to a first value, a CSI report contains PMI values pertaining to $\{i_{1,1}, i_{1,2}, i_{2,1}, i_{2,2}\}$. But when csi-Report-Type-r13 (or csi-Report-Class-r13) is set to a second value, a CSI report contains at least one PMI value pertaining to $\{i_{2,1}, i_{2,2}\}$. Likewise, if $\{i_{1,1}, i_{1,2}, i_2\}$ are the PMI values associated with $\{W_{L,V}, W_{L,H}, V\}$, when csi-Report-Type-r13 (or csi-Report-Class-r13) is set to a first value, a CSI report contains PMI values pertaining to $\{i_{1,1}, i_{1,2}, i_2\}$. But when csi-Report-Type-r13 (or csi-Report-Class-r13) is set to a second value, a CSI report contains at least one PMI value pertaining to $\{i_2\}$.

TABLE 1C illustrates another example for two separate processes:

TABLE 1C

Two separate processes, example 3
CSI-Process information elements

```
-- ASN1START
CSI-Process-r13 ::=        SEQUENCE {
    csi-ProcessId-r13          CSI-ProcessId-r13,
    csi-RS-ConfigNZPId-r13     CSI-RS-ConfigNZPId-r13,
    csi-Report-Type-r13        ENUMERATED {...} // indicating CSI reporting type
    (or csi-Report-Class-r13)
    csi-IM-ConfigId-r13        CSI-IM-ConfigId-r13,
    p-C-AndCBSRList-r13 SEQUENCE (SIZE (1..2)) OF P-C-AndCBSR-r13,
    cqi-ReportBothProc-r13     CQI-ReportBothProc-r13 OPTIONAL,-- Need OR
    cqi-ReportPeriodicProcId-r13   INTEGER (0..maxCQI-ProcExt-r13) OPTIONAL,--
       Need OR
    cqi-ReportAperiodicProc-r13    CQI-ReportAperiodicProc-r13 OPTIONAL, --
       Need OR
    ...,
    ...
}
-- ASN1STOP
```

TABLE 2 describes an exemplary NZP CSI-RS resource configuration. To support FD-MIMO (in Rel. 13), the set of possible number of ports needs to be extended, for instance, to a set of even numbers up to 16. In addition, an RRC parameter which indicates 2D antenna port pattern (termed antennaPorts2DPattern-r13 for illustrative purposes) can be introduced. This parameter applies especially for NP CSI-RS and can consist of either one value (representing one of the two dimensions) or two values (representing both dimensions). If the number of antenna ports is included in this configuration, only one value (representing only one of the two dimensions) is needed in antennaPorts2DPattern-r13. On the other hand, if the number of antenna ports is not included in this configuration, two values (representing only one of the two dimensions) can be used in a antennaPorts2DPattern-r13. When used for BF CSI-RS, this parameter can be set to a NULL value.

TABLE 2

NZP CSI-RS resource configuration
CSI-RS-ConfigNZP information elements

```
-- ASN1START
CSI-RS-ConfigNZP-r13 ::=  SEQUENCE {
    csi-RS-ConfigNZPId-r13     CSI-RS-ConfigNZPId-r13,
    antennaPortsCount-r13      ENUMERATED {an1, an2, an4, an6,
       an8, an10, an12, an14, an16},
    antennaPorts2DPattern-r13  ENUMERATED {...} // indicating 2D
       antenna port pattern
    resourceConfig-r13         INTEGER (0..31),
    subframeConfig-r13         INTEGER (0..154),
    scramblingIdentity-r13     INTEGER (0..503),
    ...
}
-- ASN1STOP
```

TABLE 2B describes another exemplary NZP CSI-RS resource configuration that is a variation of TABLE 2. Instead of an RRC parameter which indicates 2D antenna port pattern (termed antennaPorts2DPattern-r13 for illustrative purposes), a codebook selection or setting parameter (termed CBSetting-r13 for illustrative purposes) can be introduced. This parameter applies especially for NP CSI-RS but can also be used for BF CSI-RS if needed.

TABLE 2B

NZP CSI-RS resource configuration
CSI-RS-ConfigNZP information elements

```
-- ASN1START
CSI-RS-ConfigNZP-r13 ::=   SEQUENCE {
    csi-RS-ConfigNZPId-r13     CSI-RS-ConfigNZPId-r13,
    antennaPortsCount-r13      ENUMERATED {an1, an2, an4, an6,
       an8, an10, an12, an14, an16},
    CBSetting-r13              ENUMERATED {...} // indicating
       codebook selection
```

TABLE 2B-continued

NZP CSI-RS resource configuration
CSI-RS-ConfigNZP information elements

```
    resourceConfig-r13           INTEGER (0..31),
    subframeConfig-r13           INTEGER (0..154),
    scramblingIdentity-r13       INTEGER (0..503),
    ...
}
-- ASN1STOP
```

TABLE 2C describes another exemplary NZP CSI-RS resource configuration that is a variation of TABLE 2. Instead of an RRC parameter which indicates 2D antenna port pattern (termed antennaPorts2DPattern-r13 for illustrative purposes), a codebook selection or setting parameter (termed CBSetting-r13 for illustrative purposes) can be introduced. This parameter applies especially for NP CSI-RS but can also be used for BF CSI-RS if needed. In addition, a CSI-RS type parameter is introduced.

TABLE 2C

NZP CSI-RS resource configuration
CSI-RS-ConfigNZP information elements

```
-- ASN1START
CSI-RS-ConfigNZP-r13 ::=    SEQUENCE {
    csi-RS-ConfigNZPId-r13       CSI-RS-ConfigNZPId-r13,
    antennaPortsCount-r13        ENUMERATED {an1, an2, an4, an6,
      an8, an10, an12, an14, an16},
    CBSetting-r13                ENUMERATED {...} // indicating
      codebook selection
    csi-RS-Type-r13              ENUMERATED {np, bf}
    resourceConfig-r13           INTEGER (0..31),
    subframeConfig-r13           INTEGER (0..154),
    scramblingIdentity-r13       INTEGER (0..503),
    ...
}
-- ASN1STOP
```

TABLE 2D describes another exemplary NZP CSI-RS resource configuration that is a variation of TABLE 2. Neither an RRC parameter which indicates 2D antenna port pattern (termed antennaPorts2DPattern-r13 for illustrative purposes) nor a codebook selection parameter (termed CBSelect-r13 for illustrative purposes) is introduced. It is assumed that only one codebook is utilized for a given number of antenna ports.

TABLE 2D

NZP CSI-RS resource configuration
CSI-RS-ConfigNZP information elements

```
-- ASN1START
CSI-RS-ConfigNZP-r13 ::=    SEQUENCE {
    csi-RS-ConfigNZPId-r13       CSI-RS-ConfigNZPId-r13,
    antennaPortsCount-r13        ENUMERATED {an1, an2, an4, an6,
      an8, an10, an12, an14, an16},
    resourceConfig-r13           INTEGER (0..31),
    subframeConfig-r13           INTEGER (0..154),
    scramblingIdentity-r13       INTEGER (0..503),
    ...
}
-- ASN1STOP
```

The labels "NP" and "BF" (or "np" and "bf") are exemplary and can be substituted with other labels. In general, the exemplary embodiments in TABLE 2, 2A, 2B, 2C, and 2D configure two NZP CSI-RS resources with two CSI processes, where a first CSI-RS resource (CSI-RS resource 1) and a second CSI-RS resource (CSI-RS resource 2) can have the same or different configuration setups. The number of antenna ports for these two CSI-RS resources can be independently configured.

Two Separate NZP CSI-RS Resources Per CSI Process, One CSI Process

Two exemplary higher-layer (RRC) configurations are described in TABLE 3A and 3B. The names and enumerations (when applicable) of the new RRC parameters are exemplary and illustrative.

The first example (TABLE 3A) defines one CSI reporting configuration for both types of CSI-RS. The second example (TABLE 3B) defines two independent CSI reporting configurations, one for NP CSI-RS, another for BF CSI-RS. In both examples, two CSI-RS configurations csi-RS-ConfigNZPId-NP-r13 (for NP CSI-RS) and csi-RS-ConfigNZPId-BF-r13 (for BF CSI-RS) are defined independently. Each of these CSI-RS configurations is defined similarly to that exemplified in TABLE 2.

TABLE 3A

Two separate resources one CSI process, example 1
CSI-Process information elements

```
-- ASN1START
CSI-Process-r13 ::=     SEQUENCE {
    csi-ProcessId-r13             CSI-ProcessId-r13,
    csi-RS-ConfigNZPId-NP-r13     CSI-RS-ConfigNZPId-NP-r13,
    csi-RS-ConfigNZPId-BF-r13     CSI-RS-ConfigNZPId-BF-r13,
    csi-IM-ConfigId-r13           CSI-IM-ConfigId-r13,
    p-C-AndCBSRList-r13               SEQUENCE (SIZE (1..2))  OF P-C-AndCBSR-r13,
    cqi-ReportBothProc-r13        CQI-ReportBothProc-r13 OPTIONAL,-- Need OR
    cqi-ReportPeriodicProcId-r13      INTEGER  (0..maxCQI-ProcExt-r13) OPTIONAL,--
      Need OR
    cqi-ReportAperiodicProc-r13       CQI-ReportAperiodicProc-r13  OPTIONAL,-- Need
      OR
    ...,
    ...
}
-- ASN1STOP
```

TABLE 3B

Two separate resources one CSI process, example 2
CSI-Process information elements

```
-- ASN1START
CSI-Process-r13 ::=         SEQUENCE {
    csi-ProcessId-r13           CSI-ProcessId-r13,
    csi-RS-ConfigNZPId-NP-r13   CSI-RS-ConfigNZPId-NP-r13,
    csi-RS-ConfigNZPId-BF-r13   CSI-RS-ConfigNZPId-BF-r13,
    csi-IM-ConfigId-r13         CSI-IM-ConfigId-r13,
    p-C-AndCBSRList-r13  SEQUENCE (SIZE (1..2) OF P-C-AndCBSR-r13,
    cqi-ReportBothProc-NP-r13       CQI-ReportBothProc-NP-r13   OPTIONAL,-- Need
        OR
    cqi-ReportPeriodicProcId-NP-r13   INTEGER (0..maxCQI-ProcExt-r13)
        OPTIONAL,-- Need OR
    cqi-ReportAperiodicProc-NP-r13    CQI-ReportAperiodicProc-NP-r13 OPTIONAL,-
        - Need OR
    cqi-ReportBothProc-BF-r13       CQI-ReportBothProc-BF-r13 OPTIONAL,-- Need
        OR
    cqi-ReportPeriodicProcId-BF-r13   INTEGER (0..maxCQI-ProcExt-r13)   OPTIONAL,
        -- Need OR
    cqi-ReportAperiodicProc-BF-r13    CQI-ReportAperiodicProc-BF-r13 OPTIONAL,-
        - Need OR
    ...,
    ...
}
-- ASN1STOP
```

TABLE 3C describes another exemplary CSI process configuration which is a variation of TABLE 3A. In this embodiment, two CSI-IM configurations are used, one for NP CSI-RS, another for BF CSI-RS.

TABLE 3C

Two separate resources one CSI process, example 3
CSI-Process information elements

```
-- ASN1START
CSI-Process-r13 ::=         SEQUENCE {
    csi-ProcessId-r13           CSI-ProcessId-r13,
    csi-RS-ConfigNZPId-NP-r13   CSI-RS-ConfigNZPId-NP-r13,
    csi-RS-ConfigNZPId-BF-r13   CSI-RS-ConfigNZPId-BF-r13,
    csi-IM-ConfigId-NP-r13      CSI-IM-ConfigId-NP-r13,
    csi-IM-ConfigId-BF-r13      CSI-IM-ConfigId-BF-r13,
    p-C-AndCBSRList-r13         SEQUENCE (SIZE (1..2)) OF P-C-AndCBSR-r13,
    cqi-ReportBothProc-r13      CQI-ReportBothProc-r13 OPTIONAL,-- Need OR
    cqi-ReportPeriodicProcId-r13    INTEGER (0..maxCQI-ProcExt-r13) OPTIONAL,--
        Need OR
    cqi-ReportAperiodicProc-r13     CQI-ReportAperiodicProc-r13 OPTIONAL,-- Need
        OR
    ...,
    ...
}
-- ASN1STOP
```

The labels "NP" and "BF" (or "np" and "bf") are exemplary and can be substituted with other labels such as "1" and "2," or "classA" and "classB." In general, the exemplary embodiments in TABLE 3A, 3B, and 3C configure two NZP CSI-RS resources for one CSI process, where a first CSI-RS resource (CSI-RS resource 1) and a second CSI-RS resource (CSI-RS resource 2) can have the same or different configuration setups. The number of antenna ports for these two CSI-RS resources can be independently configured.

Alternatively, these two types of CSI-RS can be differentiated from UE perspective by the use of CSI reporting type or class. For example, a class one or A can correspond to non-precoded CSI-RS and a class two or B can correspond to beamformed CSI-RS.

Variations

There are also variations of embodiment which apply to at least two of the schemes described above. For example:

For embodiments which signal $N_P$, more than one values of $N_P$ can be signaled via one UL grant (one UL grant carrying multiple values of $N_P$) or multiple UL grants (with multiple UL grants implying that each UL grant corresponds to one value of $N_P$). In this case, each value of $N_P$ represents a particular transmission hypothesis. For instance, two values of $N_P$ are defined: 1) $N_P$=x associated with SU transmission to UE-k, and 2) $N_P$ (smaller than, e.g., 1) associated with MU transmission.

Accordingly, the UE responds by reporting one CSI feedback for each value of $N_P$. These multiple CSI feedbacks may be reported via one or multiple CSI configurations.

Each $N_P$ value is associated with a distinct precoded CSI-RS resource allocation. So using multiple values of $N_P$ implies multiple CSI-RS resource configurations.

In general, precoding of CSI-RS with $W_L$ associated with different values of $N_P$ may be different. But it is possible for the eNodeB to choose $W_L$ associated with a smaller value of $N_P$ as a matrix subset of $W_L$ associated with larger $N_P$ value (the columns of $W_L$ associated with the smaller $N_P$ value are a subset of that associated with larger $N_P$ values).

Other Supporting Components

Two use cases (pertaining to its advantages) are worth mentioning for this invention:

Case 1: To save CSI-CS resources (and hence increase coverage) through partial precoding of CSI-RS Case 2: To allow operation for >8 TXRU by using a max of 8 CSI-RS ports. Here VCRI is needed if the UE needs to know the subset selection.

In terms of DL signaling, the above disclosure may require some new DL control information (DCI) formats.

For Alt 0-A and 0-B, there is no need for signaling the number of CSI-RS ports or the subset selection.

For Alt 1-A or 1-B, there are no reserved values that can be used in format 0. So we need a new DCI field at least for format 0. But for format 4, there are some reserved values that could be used in the "Precoding information and number of layers" field, perhaps in conjunction with some new DCI fields.

Alt 1-A: The size-$N_S$ subset selection from the M CSI-RS ports is configured in the RRC configuration (for CSI-RS resource allocation), i.e., VCRI.

Alt 1-B: The number of CSI-RS ports that the UE of interest (UE-k) shall assume and decode $N_P$ (which is ≤ the number of ports given in the RRC configuration).

For example, the following reserved fields in "precoding information and number of layers" of DCI format 4 (highlighted in boldface italics) may be used for this purpose, at least partially (cf. TS 36.212). For 2 CSI-RS ports, seven values are available for Alt 1-A/Alt 1-B to indicate either VCRI or $N_P$. For 4 CSI-RS ports, 35 values are available.

TABLE 5.3.3.1.8-2

(From TS36.212): Content of precoding information field for 2 antenna ports

| One codeword:<br>Codeword 0 enabled<br>Codeword 1 disabled | | One codeword:<br>Codeword 0 enabled<br>Codeword 1 enabled | |
|---|---|---|---|
| Bit field mapped to index | Message | Bit field mapped to index | Message |
| 0 | 1 layer: TPMI = 0 | 0 | 2 layers: TPMI = 0 |
| 1 | 1 layer: TPMI = 1 | 1-7 | Reserved |
| 2 | 1 layer: TPMI = 2 | | |
| . . . | . . . | | |
| 5 | 1 layer: TPMI = 5 | | |
| 6-7 | Reserved | | |

TABLE 5.3.3.1.8-3

(From TS36.212): Content of precoding information field for 4 antenna ports

| One codeword:<br>Codeword 0 enabled<br>Codeword 1 disabled | | One codeword:<br>Codeword 0 enabled<br>Codeword 1 enabled | |
|---|---|---|---|
| Bit field mapped to index | Message | Bit field mapped to index | Message |
| 0 | 1 layer: TPMI = 0 | 0 | 2 layers: TPMI = 0 |
| 1 | 1 layer: TPMI = 1 | 1 | 2 layers: TPMI = 1 |
| . . . | . . . | . . . | . . . |
| 23 | 1 layer: TPMI = 23 | 15 | 2 layers: TPMI = 15 |
| 24 | 2 layers: TPMI = 0 | 16 | 3 layers: TPMI = 0 |
| 25 | 2 layers: TPMI = 1 | 17 | 3 layers: TPMI = 1 |
| . . . | . . . | . . . | . . . |
| 39 | 2 layers: TPMI = 15 | 27 | 3 layers: TPMI = 11 |

TABLE 5.3.3.1.8-3-continued (From TS36.212): Content of precoding information field for 4 antenna ports

| One codeword:<br>Codeword 0 enabled<br>Codeword 1 disabled | | One codeword:<br>Codeword 0 enabled<br>Codeword 1 enabled | |
|---|---|---|---|
| Bit field mapped to index | Message | Bit field mapped to index | Message |
| 40-63 | Reserved | 28 | 3 layers: TPMI = 0 |
| | | 29-63 | Reserved |

Handset (UE) Implementation for the Third Embodiment (Alt 2)

Figure 6:
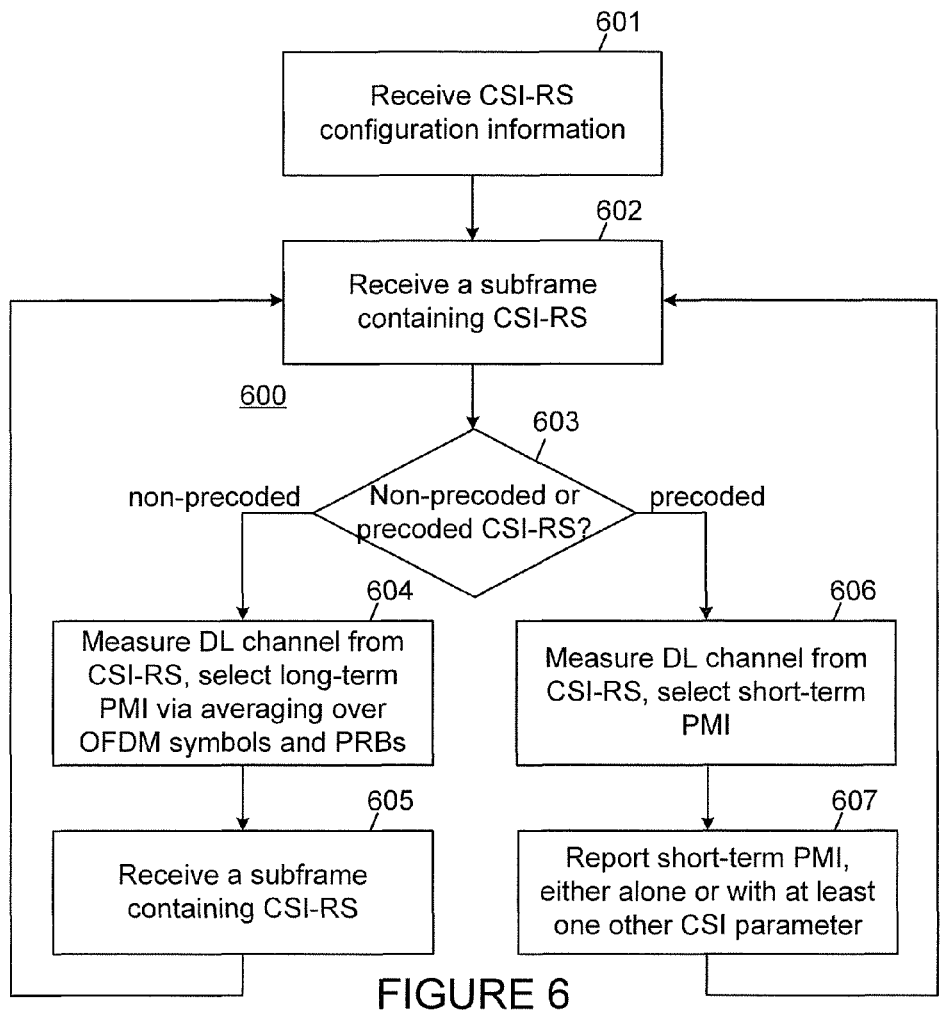
FIG. 6 is a high level flow diagram for an implementation of a process within a handset for hybrid use of non-precoded CSI-RS and precoded CSI-RS according to one embodiment of the present disclosure.

To enable Alt 2 so that a serving eNodeB may acquire some CSI from a UE for the purpose of applying precoding to CSI-RS, the following exemplary UE procedure 600 of FIG. 6 may be used.

A UE receives CSI-RS configuration information (step 601) from the serving eNodeB, which configures the UE with both non-precoded CSI-RS (a first CSI-RS) and pre-coded CSI-RS (a second CSI-RS). These two types of CSI-RS can be associated with either one CSI process and one non-zero-power (NZP) CSI-RS resource, one CSI process and two NZP CSI-RS resources, or two CSI processes. This CSI-RS configuration informs the UE of the locations (in time and frequency such as subframes and PRBs) of each of the two CSI-RS types. This information can be signaled to the UE via higher layer (RRC) signaling.

For each of the CSI-RS type, the number of CSI-RS ports needs to be signaled to the UE. For non-precoded CSI-RS, the number of ports is a part of the NZP CSI-RS resource configuration message (via higher layer signaling). For precoded CSI-RS, this entails the parameter $N_P$ discussed in Alt1 and Alt2, which can be signaled either semi-statically or dynamically. This configuration information contains a set of properties for CSI-RS or CSI-RS resource.

Alternatively, the UE can respond to configuration information pertaining to CSI reporting modes which is included in a CSI process configuration. For example, this configuration entails the mode and/or type/class or submode of CSI reporting which differentiates between PMI reporting which contains PMI values associated with $W_L$ and PMI reporting which contains PMI values associated with V only. This can be the case when an explicit second type of CSI-RS is neither defined nor signaled to the UE.

Based on the configuration information, the UE, upon receiving a non-precoded (a first) CSI-RS in a configured subframe n (step 602), operates differently depending upon whether the received subframe includes non-precoded or precoded CSI-RS (step 603). For non-precoded CSI-RS, the UE measures channel state information which pertains to DL long-term channel statistics (step 604). This is performed by averaging at least across OFDM symbols containing the non-precoded CSI-RS. This averaging can also be performed across PRBs containing the non-precoded CSI-RS since a PMI associated with $W_L$ can be wideband (in addition to long-term). Alternatively, the PMI associated with $W_L$ can be determined by selecting one precoder $W_L$ which optimizes a metric for one subframe and all PRBs within a configured set of subbands. Based on this measurement, a PMI associated with $W_L$ is reported (step 605). This PMI can be reported alone or accompanied with other CSI parameters such as RI, CQI, and/or short-term PMI V.

The configuration information can include CSI-RS type parameter or another parameter from which the type of received CSI-RS can be inferred. For example, such a parameter can be a CSI reporting type/class parameter which configures the UE to report either at least one PMI value associated with $W_L$ (which can also include at least one PMI value associated with V), or at least one PMI value associated with V (without any PMI value associated with $W_L$).

Based on the configuration information, the UE, upon receiving a precoded (a second) CSI-RS in a configured subframe different from subframe n (step 602), based on the newly received subframe being including precoded CSI-RS (step 603), measures channel state information which pertains to DL short-term channel statistics (step 606). Based on this measurement, a PMI associated with short-term precoder V is reported (step 607). This PMI can be reported alone within a subframe or accompanied with other CSI parameters such as RI and/or CQI. A PMI associated with long-term precoder $W_L$ is not reported.

This process is repeated throughout successive subframes. If non-precoded CSI-RS is transmitted often enough, it is also possible to average over multiple subframes that carry non-precoded CSI-RS; that is, to select one precoder $W_L$ which optimizes a metric for all subframes (current and previous) under consideration and all PRBs within a configured set of subbands.

Signal Flow Diagrams

Figure 7:
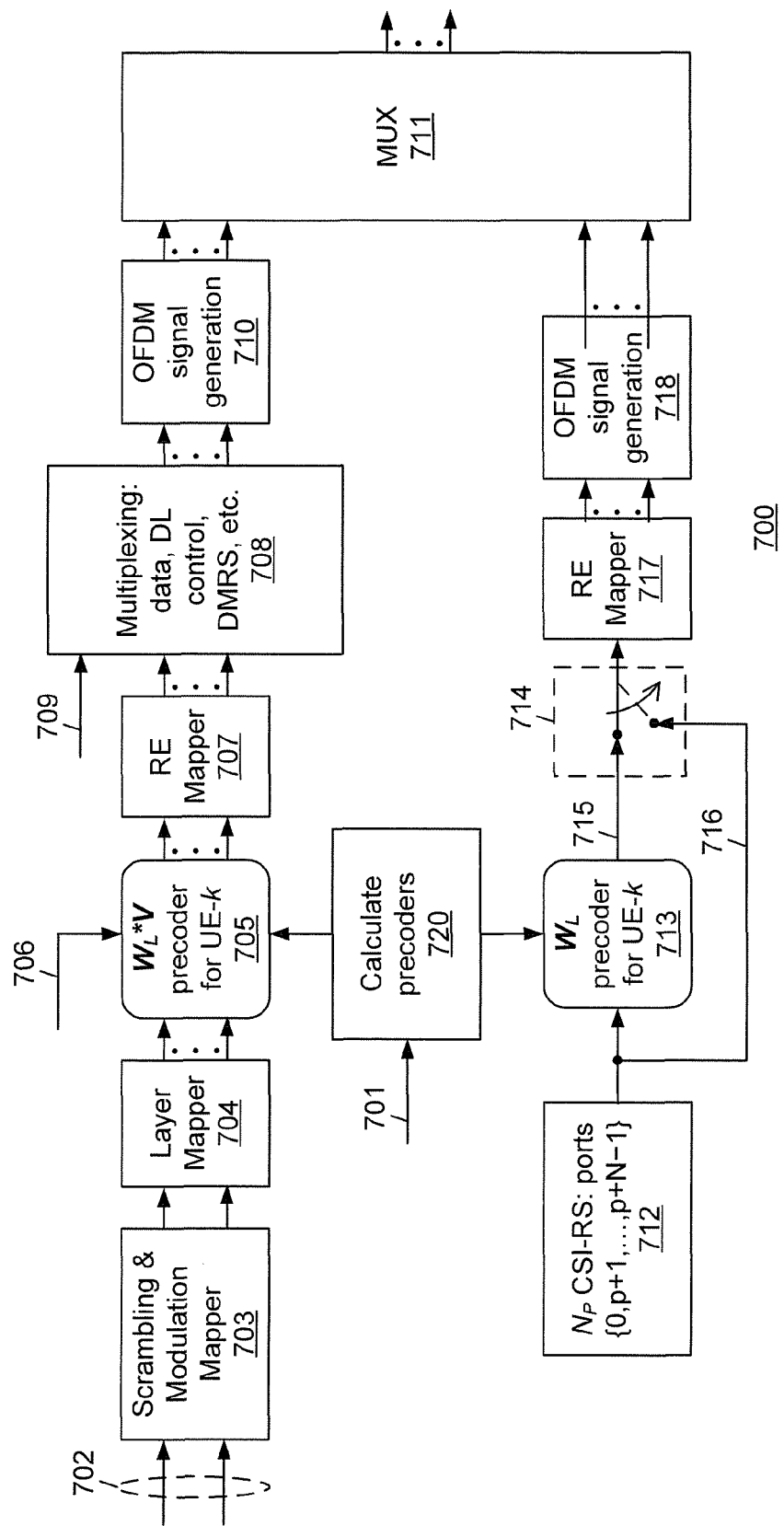
FIG. 7 is a diagram of a portion of an eNodeB implementing hybrid use of non-precoded CSI-RS and precoded CSI-RS according to one embodiment of the present disclosure.
Figure 8:
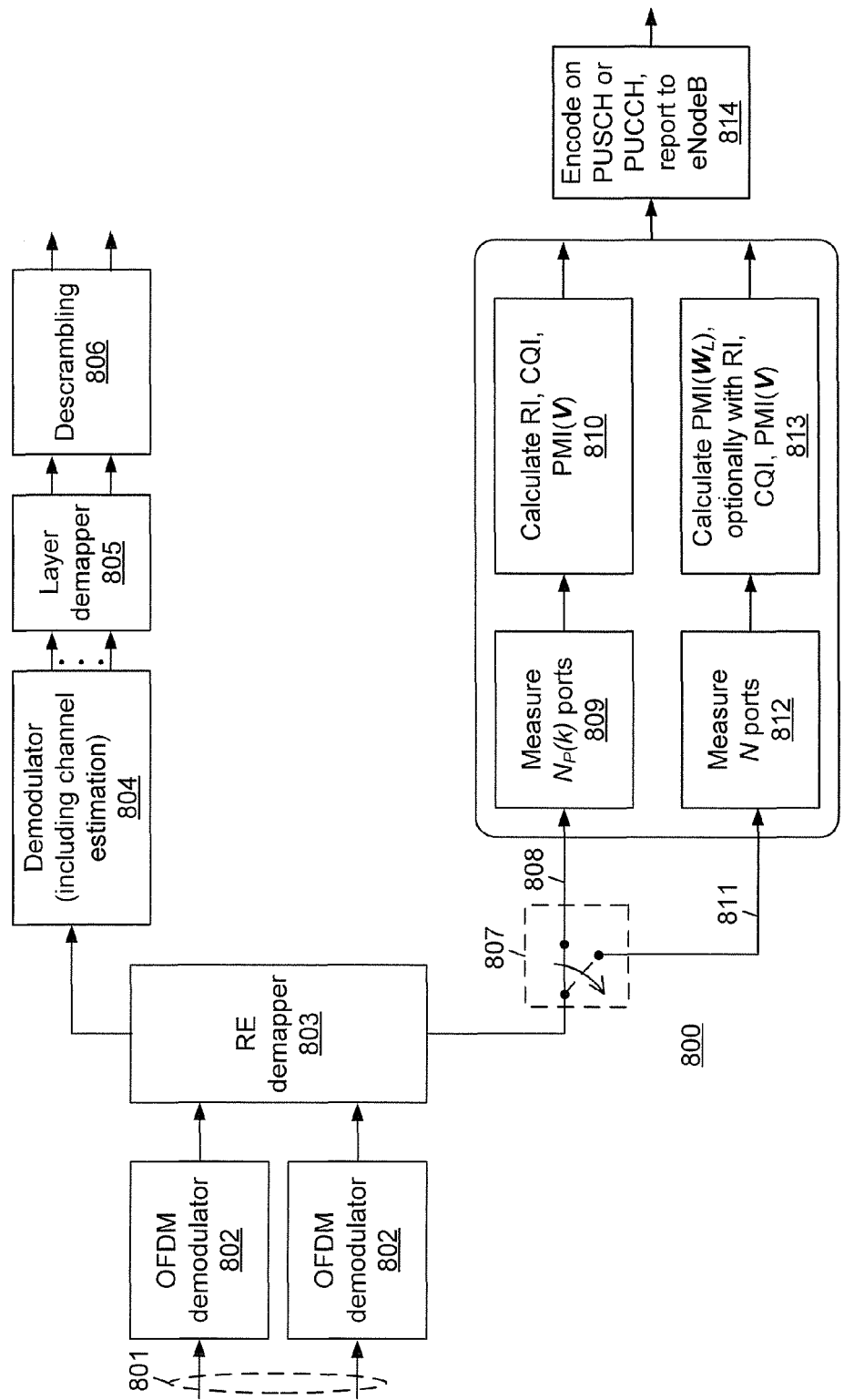
FIG. 8 is a diagram of a portion of a UE implementing hybrid use of non-precoded CSI-RS and precoded CSI-RS according to one embodiment of the present disclosure.

To describe the operations associated with precoded CSI-RS, exemplary transmitter (eNodeB) and receiver (UE) signal flow diagrams are given in FIGS. 7 and 8. In both descriptions, operations on data and CSI-RS are shown in parallel.

In FIG. 7, a portion 700 of a serving eNodeB decodes feedback CSI reporting received at an input 701 from an RRC_CONNECTED UE-k, which contains at least one PMI value associated with a recommendation of $W_L$, or at least one PMI value associated with a recommendation of V (depending on the subframe). Based on a chosen multiplexing pattern between non-precoded and precoded CSI-RS, the eNodeB determines whether the N-port non-precoded CSI-RS is precoded with $W_L$ (derived from the feedback from the UE) or not. The data, on the other hand, is always precoded with $W_L V$.

Data in the form of codewords to be transmitted is received by eNodeB portion 700 at inputs 702 to a scrambling and modulation mapper 703, which is coupled through a layer mapper 704 to a precoder 705 for UE-k that employs $W_L V$ and DMRS from input 706. An RE mapper 707 receives the output of the precoder 705 and forwards mapped codewords to a multiplexor 708, which operates on the data in conjunction with DL control received on input 709, DMRS, etc. OFDM signal generation 710 produces OFDM data symbols forwarded to multiplexor 711 for transmission using the antenna array (not shown).

CSI-RS on $N_P$ CSI-RS ports 712 are operated on by a precoder 713 for UE-k that employs $W_L$. A CSI-RS selector 714 that selects between precoded CSI-RS for UE-k 715 on $N_P$ (k) ports and non-precoded CSI-RS 716 on N ports forwards the selected CSI-RS (precoded or non-precoded) to an RE mapper 717. Mapped CSI-RS is forward to OFDM signal generation 718, which produces CSI-RS OFDM symbols forwarded to multiplexor 711 for transmission using the antenna array. The feedback CSI reporting received on input 701 is employed by a precoder calculator 720 to generate the precoding matrix used in precoders 705 and 713.

In FIG. 8, a portion 800 of the UE separates data and CSI-RS. Based on the type of CSI-RS (either decoded or inferred from higher-layer signaling or DL control channel), the UE responds differently to the extracted CSI-RS. Assuming that the number of ports for NP CSI-RS and BF CSI-RS (for UE-k) are N and $N_P$ (k), the UE measures N ports and calculates at least one PMI value associated with recommended $W_L$ when non-precoded CSI-RS is detected in that subframe. In addition, CQI, RI, and at least one PMI value associated with recommended V can be reported as well. When precoded CSI-RS is detected in that subframe, the UE measures N ports and calculates RI, CQI, and at least one PMI value associated with recommended V.

Symbols received on inputs 801 are operated on by OFDM demodulators 802, the output of which is forwarded to RE demapper 803. Data is passed from RE demapper 803 to demodulator 804, which includes channel estimation capabilities. The output of demodulator 804 is forwarded to layer demapper 805, which forwards the demapped layers for descrambling 806 to be forwarded to a turbo decoder (not shown).

A selector 807 receives the CSI-RS from RE demapper 803. The operation of selector 807 may be based on some configuration information, whether from higher-layer signaling or DL control channel. The configuration information can include a CSI-RS type parameter or another parameter from which the type of received CSI-RS can be implicitly inferred. For example, such a parameter can be a CSI reporting type or class or submode parameter which configures the UE to report either at least one PMI value associated with $W_L$ (which can also include at least one PMI value associated with V), or at least one PMI value associated with V (without any PMI value associated with $W_L$). Precoded CSI-RS are routed by selector 807 on an output 808 connected to portions 809 and 810 within an overall CSI measurement and calculation unit and that respectively measures $N_P$ (k) ports and calculates RI, CQI and PMI(V). Non-precoded CSI-RS are routed by selector 807 on an output 811 connected to portions 812 and 813 within the overall CSI measurement and calculation unit and that respectively measures N ports and calculates PMI($W_L$), optionally together with one or more of RI, CQI and PMI(V). The CSI measurement and calculation unit then forwards the calculated CSI feedback to an encoder 814 to be encoded on PUSCH or PUCCH and reported to the eNodeB.

This disclosure covers not only the specific embodiments disclosed in the above description, but also any other variation and/or combination of any subset of the above methods that are conceivable by those familiar with the art.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station, comprising:
   a transmitter configured to transmit a signal configuring a user equipment with receiving two channel state information (CSI) reference signal (CSI-RS) resources, wherein a first of the two CSI-RS resources contains more ports and is measured less often than a second of the two CSI-RS resources;
   a receiver configured to receive two types of CSI reports from the user equipment, a first of the two types of CSI reports associated with the first CSI-RS resource and a second of the two types of CSI reports associated with the second CSI-RS resource; and a controller configured to apply a precoder across ports associated with the second CSI-RS resource in response to the first type CSI report, wherein the transmitter is configured to transmit the first CSI-RS resource in a first set of subframes and the second CSI-RS resource in a second set of subframes.

2. The base station according to claim 1, wherein the first CSI-RS resource is not precoded.

3. The base station according to claim 1, wherein the second CSI-RS resource is precoded specifically for the user equipment.

4. The base station according to claim 1, wherein the first type CSI report contains a first precoding matrix indicator (PMI) parameter of a two-PMI codebook, and the second type CSI report contains a PMI parameter of a one-PMI codebook.

5. The base station according to claim 4, wherein the first PMI parameter is calculated from a plurality of subframes and resource blocks carrying the first CSI-RS resource.

6. The base station according to claim 4, wherein the first PMI parameter is a long-term and wideband PMI.

7. A user equipment, comprising:
a processor configured to
measure channel state information reference signals (CSI-RS) of at least a first CSI-RS resource and a second CSI-RS resource, wherein the first CSI-RS resource corresponds to more ports than the second CSI-RS resource and wherein the first CSI-RS resource is measured less often than the second CSI-RS resource, and calculate two types of CSI reports, wherein a first of the two types of CSI reports is generated in response to the first CSI-RS resource and a second of the two types of CSI reports is generated in response to the second CSI-RS resource, wherein a precoder to be applied across ports associated with the second CSI-RS resource is determined in response to the first type CSI report; and a transmitter configured to report the two types of CSI reports.

8. The user equipment according to claim 7, wherein the first CSI-RS resource is not precoded.

9. The user equipment according to claim 7, wherein the second CSI-RS resource is precoded specifically for the user equipment.

10. The user equipment according to claim 7, wherein the first type CSI report contains at least a first precoding matric indicator (PMI) parameter of a two-PMI codebook and the second type CSI report contains a PMI parameter of a one-PMI codebook.

11. The user equipment in claim 10, wherein the first PMI parameter is calculated from a plurality of subframes and resource blocks carrying the first CSI-RS resource.

12. The user equipment in claim 10, wherein the first PMI parameter is a long-term and wideband PMI.

13. A method of operating a base station, comprising:
transmitting a signal configuring a user equipment with receiving two channel state information (CSI) reference signal (CSI-RS) resources, wherein a first of the two CSI-RS resources contains more ports and is measured less often than a second of the two CSI-RS resources;

receiving two types of CSI reports from the user equipment, a first of the two types of CSI reports associated with the first CSI-RS resource and a second of the two types of CSI reports associated with the second CSI-RS resource;

applying a precoder across ports associated with the second CSI-RS resource in response to the first type CSI report;

transmitting the first CSI-RS resource in a first set of subframes and the second CSI-RS resource in a second set of subframes.

14. The method according to claim 13, wherein the first CSI-RS resource is not precoded and the second CSI-RS resource is precoded specifically for the user equipment.

15. The method according to claim 13, wherein the first type CSI report contains a first precoding matrix indicator (PMI) parameter of a two-PMI codebook, and the second type CSI report contains a PMI parameter of a one-PMI codebook.

16. The method according to claim 15, wherein the first PMI parameter is a long-term and wideband PMI calculated from a plurality of subframes and resource blocks carrying the first CSI-RS resource.

17. A method of operating a user equipment, comprising:
measuring channel state information reference signals (CSI-RS) of at least a first CSI-RS resource and a second CSI-RS resource, wherein the first CSI-RS resource corresponds to more ports than the second CSI-RS resource and wherein the first CSI-RS resource is measured less often than the second CSI-RS resource;

calculating two types of CSI reports, wherein a first of the two types of CSI reports is generated in response to the first CSI-RS resource and a second of the two types of CSI reports is generated in response to the second CSI-RS resource, wherein a precoder to be applied across ports associated with the second CSI-RS resource is determined in response to the first CSI report; and reporting the two types of CSI reports.

18. The method according to claim 17, wherein the first CSI-RS resource is not precoded and the second CSI-RS resource is precoded specifically for the user equipment.

19. The method according to claim 17, wherein the first type CSI report contains a first precoding matrix indicator (PMI) parameter of a two-PMI codebook, and the second type CSI report contains a PMI parameter of a one-PMI codebook.

20. The method according to claim 19, wherein the first PMI parameter is is a long-term and wideband PMI calculated from a plurality of subframes and resource blocks carrying the first CSI-RS resource.

* * * * *